US011023840B2

(12) United States Patent
Chang et al.

(10) Patent No.: US 11,023,840 B2
(45) Date of Patent: Jun. 1, 2021

(54) SCENARIO PLANNING AND RISK MANAGEMENT

(71) Applicant: International Business Machines Corporation, Armonk, NY (US)

(72) Inventors: Yuan-Chi Chang, Armonk, NY (US); Mark D. Feblowitz, Winchester, MA (US); Nagui Halim, Yorktown Heights, NY (US); Stuart S. Horn, Southbury, CT (US); Edward J. Pring, Yorktown Heights, NY (US); Anton V. Riabov, Ann Arbor, MI (US); Edward W. Shay, White Plains, NY (US); Shirin Sohrabi Araghi, Port Chester, NY (US); Deepak S. Turaga, Elmsford, NY (US); Octavian Udrea, Ossining, NY (US); Fang Yuan, Chappaqua, NY (US); Peter Zimmer, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 336 days.

(21) Appl. No.: 15/418,377

(22) Filed: Jan. 27, 2017

(65) Prior Publication Data
US 2018/0218299 A1 Aug. 2, 2018

(51) Int. Cl.
*G06Q 10/06* (2012.01)
*G06N 5/02* (2006.01)
*G06F 16/951* (2019.01)

(52) U.S. Cl.
CPC ....... *G06Q 10/0635* (2013.01); *G06F 16/951* (2019.01); *G06N 5/02* (2013.01); *G06Q 10/067* (2013.01)

(58) Field of Classification Search
None
See application file for complete search history.

(56) References Cited

U.S. PATENT DOCUMENTS 6,012,152 A 1/2000 Douik et al.
7,006,992 B1 2/2006 Packwood
(Continued)

FOREIGN PATENT DOCUMENTS

WO WO-2012142092 A1 * 10/2012 ......... G06Q 30/0201
WO 2013119648 A1 8/2013

OTHER PUBLICATIONS

Damerow, F., & Eggert, J. (2014). Predictive risk maps. 17th International IEEE Conference on Intelligent Transportation Systems (ITSC). doi: 10.1109/itsc.2014.6957772 (Year: 2014).*

(Continued)

*Primary Examiner* — Matthew S Gart
*Assistant Examiner* — Tiera J Fletcher
(74) *Attorney, Agent, or Firm* — Amin, Turocy & Watson, LLP

(57) ABSTRACT

Techniques for scenario planning are provided. In one example, a computer-implemented method can comprise analyzing, by a device operatively coupled to a processor, content using a topic model. The content can be associated with a defined source and is related to one or more current events. The computer-implemented method can also comprise determining, by the device, one or more portions of the analyzed content that are relevant to one or more key risk drivers using a risk driver model. The computer-implemented method can also comprise aggregating, by the device, the determined one or more portions into one or more emerging storylines based on values of one or more attributes of the topic model.

12 Claims, 11 Drawing Sheets

(56) References Cited

U.S. PATENT DOCUMENTS

| | | | |
|---|---|---|---|
| 7,146,348 | B2 | 12/2006 | Geib et al. |
| 8,082,220 | B2 | 12/2011 | Hadad et al. |
| 8,250,355 | B2 | 8/2012 | Eilam et al. |
| 9,177,060 | B1 | 11/2015 | Bennett et al. |
| 9,330,119 | B2 | 5/2016 | Chan et al. |
| 2003/0050814 | A1* | 3/2003 | Stoneking ............ G06Q 10/10 705/7.39 |
| 2003/0139902 | A1 | 7/2003 | Geib et al. |
| 2007/0129834 | A1 | 6/2007 | Howard et al. |
| 2007/0150427 | A1 | 6/2007 | Geib |
| 2007/0271263 | A1 | 11/2007 | Merrild |
| 2008/0243570 | A1 | 10/2008 | Moorkanat et al. |
| 2010/0169360 | A1 | 7/2010 | Cohen et al. |
| 2011/0225002 | A1 | 9/2011 | Fackler et al. |
| 2012/0265724 | A1 | 10/2012 | Michelin |
| 2012/0323627 | A1* | 12/2012 | Herring, Jr. ............ G06Q 30/02 705/7.29 |
| 2013/0041712 | A1 | 2/2013 | Smoot et al. |
| 2013/0117060 | A1 | 5/2013 | Henriksen |
| 2013/0144917 | A1 | 6/2013 | Hosurmath et al. |
| 2013/0185119 | A1 | 7/2013 | Palao et al. |
| 2014/0052494 | A1* | 2/2014 | Anne .................. G06Q 10/063 705/7.28 |
| 2014/0310285 | A1 | 10/2014 | Chan et al. |
| 2015/0339580 | A1 | 11/2015 | Riabov et al. |
| 2015/0370766 | A1 | 12/2015 | Kossmann et al. |
| 2016/0321544 | A1 | 11/2016 | Hassanzadeh et al. |
| 2017/0056764 | A1* | 3/2017 | Shukla .................. H04L 51/32 |
| 2017/0076194 | A1 | 3/2017 | Versace et al. |
| 2017/0213131 | A1 | 7/2017 | Hammond et al. |
| 2019/0114549 | A1 | 4/2019 | Ollsher |

OTHER PUBLICATIONS

List of IBM Patents and Applications Treated as Related.

Non-Final office Action received for U.S. Appl. No. 15/418,418, dated Apr. 4, 2018, 40 pages.

Non-Final office Action received for U.S. Appl. No. 15/842,252, dated Apr. 5, 2018, 33 pages.

Sohrabi, S., et al., "Scenario Planning for Enterprise Risk Management," 5 pages.

Sohrabi, S., et al., "Multi-Agent Plan Recognition with Noisy Observations and Temporal Actions," 5 pages.

Iranmanesh, H., et al., "An Intelligent System Framework for Generating Activity List of a Project Using WBS Mind map and Semantic Network," International Journal of Computer, Electrical, Automation, Control and Information Engineering, 2008, vol. 2, No. 4, pp. 1020-1027, World Academy of Science, Engineering and Technology.

Jilani, R., et al., "ASCoL: A Tool for Improving Automatic Planning Domain Model Acquisition," AIIA, Sep. 2015, pp. 438-451, Springer International Publishing Switzerland.

Behnke, G., "Integrating Ontologies and Planning for Cognitive Systems," Proceedings of the 28th International Workshop on Description Logics, 2015, 13 pages.

Sohrabi, S., et al., "State Projection via AI Planning," 2017, 7 pages, Association for the Advancement of Artificial Intelligence.

Sohrabi, S., et al., "Hypothesis Exploration for Malware Detection using Planning," Proceedings of the Twenty-Seventh AAAI Conference on Artificial Intelligence, 2013, pp. 883-889, Association for the Advancement of Artificial Intelligence.

Riabov, A., et al., "Planning-Based Reasoning for Automated Large-Scale Data Analysis," Proceedings of the Twenty-Fifth International Conference on Automated Planning and Scheduling, 2015, pp. 282-290, Association for the Advancement of Artificial Intelligence.

Riabov, A., et al., "New Algorithms for the Top-K Planning Problem,", ICAPS 2014, pp. 10-18.

Sohrabi, S., et al., "Finding Diverse High-Quality Plans for Hypothesis Generation," 22nd European Conference on Artificial Intelligence, 2016, 2 pages.

"Riabov, A., et al., ""Efficient High Quality Plan Exploration for Network Security,"" Proceedings of the Scheduling and Planning Applications woRKshop (SPARK), 2016, 6 pages."

Sohrabi, S., et al., "Plan Recognition as Planning Revisited," Proceedings of the 25th International Joint Conference on Artificial Intelligence (IJCAI), 2016, 7 pages.

Wilkins, D., "Can AI planners solve practical problems?" Computational Intelligence Journal, 1990, 32 pages.

Tate, A., et al., "O-plan2: an open architecture for command, planning and control," Intelligent Scheduling, 1994, 26 pages.

Vaquero, T., et al., "itSIMPLE 2.0: An Integrated Tool for Designing Planning Domains," ATPS, 2007, 8 pages.

Simpson, R.M., et al., "Planning domain definition using GIPO," The Knowledge Engineering Review, 2007, vol. 22, No. 2, pp. 117-134, Cambridge University Press.

Yang, Q., et al., "Learning action models from plan examples using weighted MAX-SAT," Artificial Intelligence, 2006, pp. 107-143.

Yoon, S., et al., "Towards Model-lite Planning: A Proposal for Learning & Planning with Incomplete Domain Models," Workshop on AI Planning and Learning, 2007, 18 pages.

Zhuo, H. et al., "Refining Incomplete Planning Domain Models Through Plan Traces," Proceedings of the Twenty-Third International Joint Conference on Artificial Intelligence (IJCAI), 2013, 7 pages.

Sohrabi, S., et al., "Diagnosis as Planning Revisited," Proceedings of the Twelfth International Conference on the Principles of Knowledge Representation and Reasoning, 2010, pp. 26-36.

Sohrabi, S., et al., "Preferred Explanations: Theory and Generation via Planning," Proceedings of the Twenty-Fifth AAAI Conference on Artificial Intelligence, 2011, pp. 261-267.

Haslum, P., et al., "Diagnosis As Planning: Two Case Studies," International Scheduling and Planning Applications woRKshop (SPARK), 2011, 8 pages.

Ramírez, M., et al., "Plan Recognition as Planning," Proceedings of the 21st International Joint Conference on Artificial Intelligence (IJCAI), 2009, 6 pages.

U.S. Appl. No. 14/962,714, filed Dec. 8, 2015, and entitled, "Plan Recognition With Unreliable Observations," 88 pages.

Schoemaker, P., "Scenario Planning: A Tool for Strategic Thinking," Sloan Management Review, 1995, vol. 36, No. 2, pp. 25-40.

"Risk management—Principles and guidelines on implementation," ISO/DIS 3100, 2009, International Organization for Standardization, 28 pages.

Shvo, M., et al., "An AI Planning-Based Approach to the Multi-Agent Plan Recognition Problem (Preliminary Report)," 2017, 9 pages.

"Multi-Criteria Approach to Planning and Scheduling through Criticism and Repair," ip.comTechnical Disclosure, Dec. 19, 2013, 7 pages.

"IBM Quality Program," ip.com Technical Disclosure, Apr. 11, 2007, 3 pages.

Kaminka, G., et al., "Monitoring Teams by Overhearing: A Multi-Agent Plan-Recognition Approach," Journal of Artificial Intelligence Research, 2002, vol. 17, pp. 83-135.

Banerjee, B., et al., "Multi-Agent Plan Recognition: Formalization and Algorithms," Proceedings of the Twenty-Fourth AAAI Conference on Artificial Intelligence, 2010, pp. 1059-1064.

"Mind map," Wikipedia, https://en.wikipedia.org/wiki/Mind_map, Last accessed Jan. 24, 2017, 5 pages.

Office Action dated Aug. 3, 2018 for U.S. Appl. No. 15/418,418, 40 pages.

Office Action dated Aug. 3, 2018 for U.S. Appl. No. 15/842,252, 45 pages.

Non-Final Office Action received for U.S. Appl. No. 14/962,714 dated Aug. 8, 2018, 44 pages.

Final Office Action received for U.S. Appl. No. 14/962,714 dated Mar. 4, 2019, 17 pages.

Chen et al., "A planning approach to the recognition of multiple goals", International Journal of Intelligent Systems vol. 28, No. 3, 2013, pp. 203-216.

Brenner et al., "Continual Planning and Acting in dynamic Multiagent Environments", Autonomous Agents and Multi-Agent Systems, vol. 19, No. 3, 2009, 12 pages.

(56) References Cited

OTHER PUBLICATIONS

Fraser et al., "Plan Execution in Dynamic Environments." In International Conference on Industrial, Engineering and Other Applications of Applied Intelligent Systems, Springer, Berlin, Heidelberg, 2005, 10 pages.

Boutilier et al., "Planning Under Uncertainty: Structural Assumptions and Computational Leverage", Proceedings of the Second European Workshop on Planning, 1995, 16 pages.

Sampath et al., "Diagnosability of Discrete-Event Systems", IEEE Transactions on Automatic Control, vol. 40, No. 9, Sep. 1995, pp. 1555-1575.

Cordier et al., "Event-Based Diagnosis for Evolutive Systems", Fifth International Workshop on Principles of Diagnosis, Oct. 17-19, 1994, 24 pages.

Thorsley et al., "Diagnosability of Stochastic Discrete-Event Systems Under Unreliable Observations", American Control Conference, Jun. 11-13, 2008, pp. 1158-1165.

Grastien et al., "Exhaustive Diagnosis of Discrete Event Systems through Exploration of the Hypothesis Space", Twenty-Second International Workshop on Principles of Diagnosis, Oct. 4-7, 2011, 8 pages.

Grastien et al., "Diagnosis of Discrete-Event Systems Using Satisfiability Algorithms", Proceedings of the National Conference on Artificial Intelligence, vol. 22, No. 1, Jul. 22-26, 2007, 6 pages.

Mcilraith, Sheila A., "Towards a Theory of Diagnosis, Testing and Repair", Proceedings of the Fifth International Workshop on Principles of Diagnosis, Oct. 17-19, 1994, 8 pages.

Ramirez et al., "Probabilistic Plan Recognition Using Off-the-Shelf Classical Planners", Proceedings of the Twenty-Fourth AAAI Conference on Artificial Intelligence, Jul. 11-15, 2010, 6 pages.

Pommerening et al., "Optimal Planning for Delete-Free Tasks with Incremental LM-Cut", Proceedings of the Twenty-Second International Conference on Automated Planning and Scheduling, Jun. 25-29, 2012, pp. 363-367.

Nguyen et al.",Generating diverse plans to handle unknown and partially known user preferences", Artificial Intelligence, Jun. 18, 2012, pp. 1-31.

Srivastava et al., "Domain Independent Approaches for Finding Diverse Plans", International Joint Conference on Artificial Intelligence, Jan. 2007, 7 pages.

Bryce, Daniel., "Landmark-Based Plan Distance Measures for Diverse Planning", Proceedings of the Twenty-Fourth International Conference on Automated Planning and Scheduling, Jun. 21-26, 2014, pp. 56-64.

Coman et al., "Generating Diverse Plans Using Quantitative and Qualitative Plan Distance Metrics", Proceedings of the Twenty-Fifth AAAI Conference on Artificial Intelligence, Aug. 7-11, 2011, pp. 946-951.

Eppstein, David., "Finding the k Shortest Paths", Department of Information and Computer Science, University of California, Irvine, Mar. 31, 1997, pp. 1-26.

Gerevini et al., "Planning through Stochastic Local Search and Temporal Action Graphs in LPG", Journal of Artificial Intelligence Research, vol. 20, Dec. 2003, pp. 239-290.

Roberts et al., "Evaluating Diversity in Classical Planning", Proceedings of the Twenty-Fourth International Conference on Planning and Scheduling, Jun. 21-26, 2014, pp. 253-261.

Aslam et al., "The Star Clustering Algorithm for Information Organization", Grouping Multidimensional Data, Springer-Verlag, 2006, pp. 1-24.

Xu et al., "Survey of Clustering Algorithms", IEEE Transactions on Neural Networks, vol. 16, No. 3, May 2005, pp. 645-678.

Filippone et al., "A Survey of Kernel and Spectral Methods for Clustering", Pattern Recognition, vol. 41, No. 1, May 29, 2007, 37 pages.

Non-Final Office Action received for U.S. Appl. No. 16/295,731 dated Apr. 4, 2019, 47 pages.

Non-Final Office Action received for U.S. Appl. No. 16/296,364 dated May 1, 2019, 29 pages.

List of IBM Patents or Applications Treated as Related.

Final Office Action received for U.S. Appl. No. 15/842,281 dated Dec. 11, 2019, 38 pages.

Non-Final Office Action received for U.S. Appl. No. 15/418,452 dated Dec. 31, 2019, 53 pages.

Non-Final Office Action received for U.S. Appl. No. 15/842,281 dated Jul. 29, 2019, 53 pages.

Non-Final Office Action received for U.S. Appl. No. 15/418,452 dated Jun. 2, 2020, 18 pages.

Brailean et al, Noise Reduction Filters for Dynamic Image Sequences: A Review, 1995, IEEE (Year: 1995).

Final Office Action received for U.S. Appl. No. 15/418,452 dated Feb. 14, 2020, 17 pages.

Non-Final Office Action received for U.S. Appl. No. 15/842,281 dated Apr. 15, 2020, 31 pages.

Final Office Action received for U.S. Appl. No. 15/842,281 dated Jul. 9, 2020, 29 pages.

Office Action received for U.S. Appl. No. 16/717,146 dated Oct. 2, 2020, 73 pages.

Yang et al. "Proceedings of the Fifteenth International Conference on Automated Planning and Scheduling," pp. 241-250. Monterey, CA, USA, Jun. 2005. AAAI Press. (Year: 2005).

Non-Final Office Action received for U.S. Appl. No. 15/842,449 dated Oct. 27, 2020, 70 pages.

Office Action received for U.S. Appl. No. 16/717,146 dated Feb. 10, 2021, 41 pages.

Notice of Allowance received for U.S. Appl. No. 15/842,281 dated Feb. 5, 2021, 29 pages.

Final Office Action received for U.S. Appl. No. 15/842,449 dated Feb. 2, 2021, 18 pages.

* cited by examiner

SCENARIO PLANNING AND RISK MANAGEMENT

STATEMENT REGARDING FEDERALLY SPONSORED RESEARCH OR DEVELOPMENT

This invention was made with Government support under Contract No.: H98230-13-D-0054/0006 awarded by Department of Defense. The Government has certain rights in this invention.

BACKGROUND

The subject disclosure relates to scenario planning, and more specifically, to artificial intelligence based solutions to scenario planning and artificial intelligence based solutions to risk management.

Scenario planning can be used by businesses and governments to develop long term future plans. Scenario planning for risk management puts added emphasis on identifying the extreme but possible risks that are not usually considered in daily operations. Generally, scenario planning has relied upon historical trends, with these historical trends being analyzed to determine whether current situations or a related factual pattern matches these historical trends. Subsequent to this analysis, the historical outcome is analyzed to determine a likelihood that a current situation may or may not be imminent. Thus, these analyses rely on known or recorded issues, trends, and previous outcomes. Accordingly, new trends are not directly considered outside of known or existing trends, which can result in inadequate or unlikely projections.

Furthermore, existing systems for emerging risk management are also reliant on historical analysis. For example, Smoot et al., U.S. Patent Application Publication Number 2013/0041712A1, describes an "emerging risk identification process and tool." In Smoot et al., it is presented that [m]anaging risks may include receiving multiple issues associated with an enterprise where each issue is a future risk or a current risk, storing the issues, aggregating the issues, filtering the issues by executing a predefined rule set to determine a set of issues for analysis, creating a report including the set of issues for analysis, and transmitting the report to a user." However, Smoot et al. does not address issues from dynamic and defined sources, such as information from current events.

As another example, Anne et al., U.S. Patent Application Publication Number 2014/0052494, describes "identifying scenarios and business units that benefit from scenario planning for operational risk scenario analysis using analytical and quantitative methods." Anne et al. describes that "a historical heat loss heat map may be utilized to show past historical pain points and loss recovery rate information." However, Anne et al. does not address utilizing dynamic and defined sources, such as information from current events.

Furthermore, many other conventional approaches rely heavily on historical analyses and monitoring of action items related to the analyses. Thus, new trends, emerging trends, and other unknown risks may not be appropriately identified and applied to risk models.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate machine learning to provide incremental static program analysis.

Scenario planning can be used by businesses and governments to develop long term future plans. Scenario planning for risk management puts added emphasis on identifying the extreme but possible risks that are not usually considered in daily operations. While a variety of methods and tools have been proposed for this purpose, embodiments of this disclosure provide formulating of planning techniques that comprise a unique advantage for scenario planning According to this disclosure, systems, computer-implemented methods, computer program products, and other implementations can receive as input relevant news, social media trends, and other input from defined sources that characterize the current situation.

In response to the input, this disclosure provides for receiving selections of representative key observations, as well as a novel risk driver model developed by risk management experts in a graphical tool. An artificial intelligence planner component can also be used to generate multiple artificial intelligence plans explaining the observations and projecting future states. The resulting plans can then be clustered and summarized to generate scenarios for use in scenario planning and risk management.

Accordingly, embodiments of this disclosure can analyze current trends, current information, current news, current key risk drivers, expert knowledge, expert observations, expert feedback, and other related attributes to develop and predict future scenarios that can solve drawbacks related to current systems. Furthermore, embodiments of this disclosure can comprise novel feedback mechanisms that can refine the predicted future scenarios based on real-time data and expert feedback.

According to an embodiment, a computer-implemented method is provided. The computer-implemented method can comprise analyzing, by a device operatively coupled to a processor, content using a topic model. The content can be associated with a defined source and is related to one or more current events. The computer-implemented method can also comprise determining, by the device, one or more portions of the analyzed content that are relevant to one or more key risk drivers using a risk driver model. The computer-implemented method can also comprise aggregating, by the device, the determined one or more portions into one or more emerging storylines based on values of one or more attributes of the topic model. It follows that the emerging storylines can comprise up-to-date information related to a monitored risk management scenario. Furthermore, the emerging storylines can also take into consideration information from several current and defined sources, thereby increasing the likelihood that an associated future scenario and associated risk is accurate.

According to another embodiment, the defined source can be selected from the group consisting of news sources, web-crawling systems, user postings on social media, and trending topics on social media. Thus, emerging trends based on a plurality of defined sources can be considered in real-time, or in a relatively rapid manner. The consideration in real-time, or in a relatively rapid manner, allows for more accurate predictions of future scenarios and emerging storylines.

According to another embodiment, the topic model can comprise key people or organizations that are able to influence at least one key risk driver identified in the risk driver model. Through consideration of key people or organizations that can influence at least one key risk driver, emerging storylines are more likely to be relevant to a central concept or aspect of the scenario planning. Furthermore, the emerging storylines are also more likely to take into consideration currently relevant risk drivers that can affect a future scenario. Thus, risk mitigation, emerging risk, and/or associated business implications are also more likely to be accurate.

According to another embodiment, the computer-implemented method can comprise receiving, by the device, a selection of a key risk driver. Further, the computer-implemented method can comprise generating, by the device, one or more future scenarios using the selection of the key risk driver. Additionally, the one or more future scenarios can comprise a scenario from the group consisting of a probable emerging risk, a possible emerging risk, and an associated business implication. Accordingly, through receipt of a selection of a key risk driver, the one or more future scenarios are more likely to be accurate. Furthermore, through receipt of a selection of a key risk driver, this disclosure provides for the benefit of considering current events and relevant key risk drivers identified by experts in a particular field. The considering current events and relevant key risk drivers can provide for increased accuracy and refined future scenarios.

According to another embodiment, a computer-implemented method is provided. The computer-implemented method can comprise receiving, by a device operatively coupled to a processor, a risk driver model and receiving, by the device, a topic model. The computer-implemented method can further comprise receiving, by the device, content from a defined source. The content can be related to one or more current events. The computer-implemented method can also comprise analyzing, by the device, the received content using the topic model and determining, by the device, one or more portions of the analyzed content that are relevant to one or more key risk drivers based on the risk driver model. The computer-implemented method can also comprise outputting, by the device, the determined one or more portions as an emerging storyline based on values of one or more attributes of the topic model. The computer-implemented method can also comprise receiving, by the device, a selection of a key risk drivers responsive to outputting the emerging storyline, generating, by the device, one or more future scenarios using the selection of the key risk drivers, and outputting, by the device, the generated one or more future scenarios.

It follows that as the emerging storylines can comprise information related current events, that a monitored risk management scenario is more likely to be accurately reflected in the outputted one or more future scenarios. Furthermore, the emerging storylines can also take into consideration information from several sources, thereby increasing the likelihood that an associated future scenario and associated risk is accurate. Furthermore, the receipt of a selection of a key risk driver can allow for expert knowledge to be integrated in the outputted one or more future scenarios.

According to another embodiment, the computer-implemented method can also comprise receiving a selection of a second key risk driver responsive to the outputted one or more future scenarios, refining the generated one or more future scenarios based on the second key risk driver into a new set of one or more future scenarios, and outputting the new set of one or more future scenarios. Thus, according to this example, the second key risk driver can provide for additional expert knowledge to be integrated in the new set of one or more future scenarios.

According to another embodiment, the generated one or more future scenarios can comprise a first future scenario. Additionally, the computer-implemented method can comprise iteratively refining the first future scenario based on received feedback to create a refined future scenario. According to this example, the refined future scenario is indicative of emerging risk. Thus, the refined future scenario can be more likely to accurately reflect the emerging risk based on the plurality of defined sources and the iterative refining based on selection of key risk driver.

According to yet another embodiment, the computer-implemented method can comprise receiving a final assessment of emerging risk and mitigation actions responsive to the outputted one or more future scenarios. Therefore, the final assessment is more likely to take into consideration current, expert knowledge and current events. Thus, the final assessment is likely to accurately reflect emerging risk.

In some embodiments, elements described in connection with the computer-implemented can be embodied in different forms such as one or more program instructions stored on a computer readable storage medium, a computer program product, a system, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

This disclosure relates in some embodiments to scenario planning, and more specifically, to artificial intelligence based solutions to scenario planning and/or risk management. Scenario planning as related to projected scenarios can facilitate strategic planning Scenario planning as described herein can involve analyzing the relationship between risk drivers that explain the current situation in addition to proposing insights about the future thereby incorporating a major benefit of current knowledge and expertise to scenario planning. While expected scenarios can be interesting for verification purposes, scenarios that are surprising to a user can also be relatively significant. For example, surprising scenarios can be used to develop and/or assess varying forms of risk management.

Risk management is a set of principles that focus on the outcome of risk-taking. In this disclosure, scenario planning for risk management is addressed. Furthermore, the problem of generating scenarios with a significant focus on identifying the extreme but possible risks that are not usually considered in daily operations is also addressed. Several embodiments of this disclosure can provide the benefit of considering emerging risks based on observations from several defined sources of news and social media trends, and provide scenarios which describe the current situation and project the future possible effects of these observations. Furthermore, future projected scenarios are facilitated that can highlight potential leading indicators (e.g., the set of facts that are likely to cause a scenario), in addition to any implications (e.g., effects that a certain organization cares about).

In this disclosure, useful and novel graphical presentations of scenario planning for risk management are provided. Furthermore, the processing of new or current information is also provided in a manner that facilitates beneficial inclusion in risk management models. Through the graphical presentations of the scenario planning, feedback from experts, analysts, and other similar users can also be included in risk management models and possible future scenarios. Thus, some embodiments can also refine possible future scenarios based on both data from defined sources and expert knowledge. These and other features of this disclosure can facilitate the consideration of complexities that go beyond average human skill, with increased accuracy, and decreased time in producing a useful result.

Figure 1:
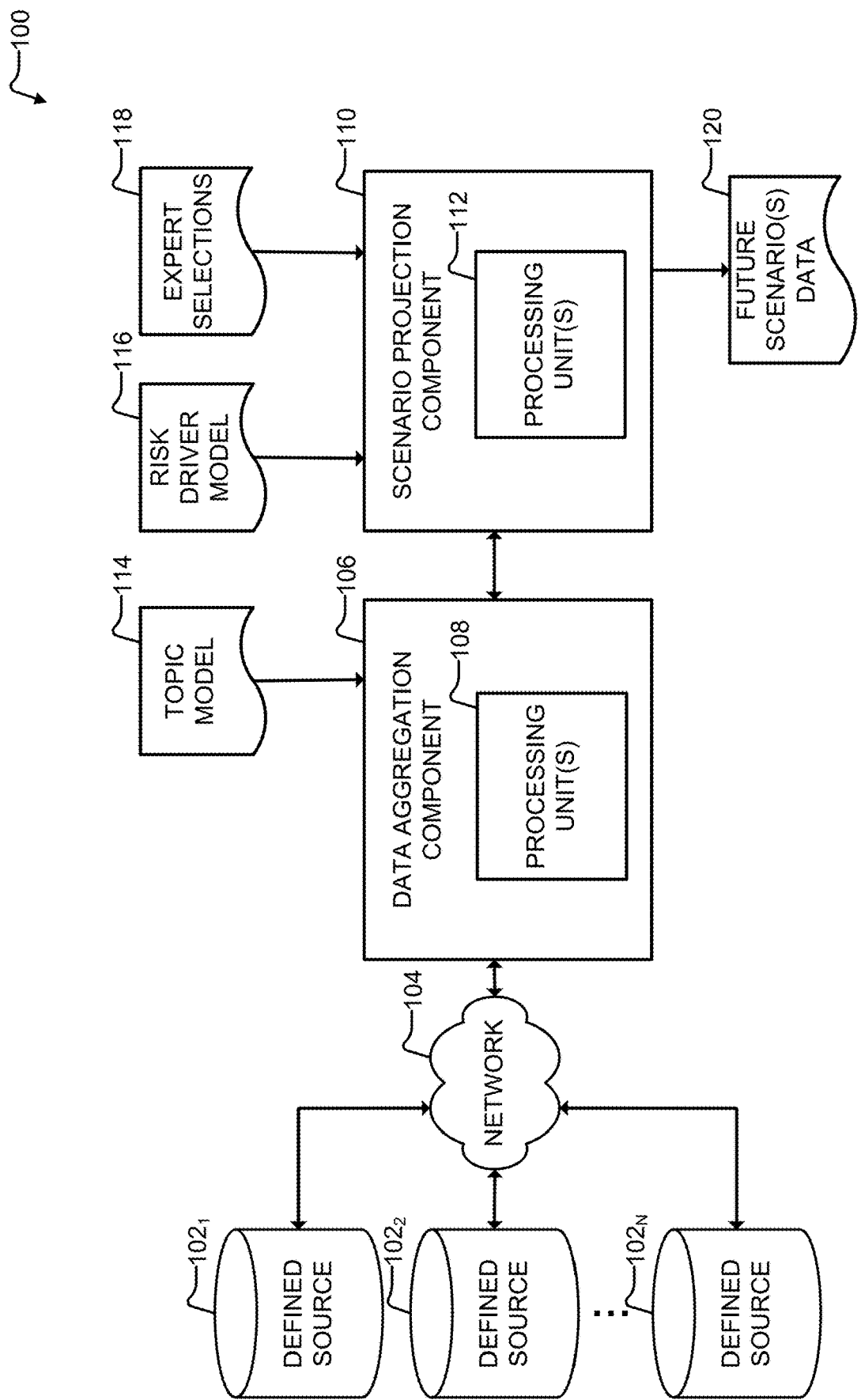
FIG. 1 illustrates a block diagram of an example, non-limiting system that can provide scenario planning in accordance with one or more embodiments of the disclosed subject matter.

Turning now to the drawings, FIG. 1 illustrates a block diagram of an example, non-limiting system 100 that can provide scenario planning in accordance with one or more embodiments of the disclosed subject matter. The system 100 can include a data aggregation component 106, and a scenario projection component 110 in electrical communication with the data aggregation component 106. As shown, the data aggregation component 106 can include one or more processing units 108 arranged to provide functionality described herein. Similarly, the scenario projection component 110 can include one or more processing units 112 arranged to provide functionality described herein. The system 100 can also include a plurality of defined sources 102 in electrical communication with the data aggregation component 106 via a network 104. The plurality of defined sources 102 can include, for example, defined source $102_1$, defined source $102_2$, and defined source $102_N$. Other arrangements of the individual illustrated components of the system 100 can also be applicable. Therefore, the particular arrangement illustrated is one non-limiting example. Repetitive description of like elements employed in other embodiments described herein is omitted for sake of brevity.

The data aggregation component 106 can include defined hardware (e.g., the processing units 108) configured to automate several program instructions described herein. The data aggregation component 106 can be arranged to receive a topic model 114 from an input device, an electronic source, or any suitable source. The topic model 114 can also be received from a domain expert, or from another suitable source. According to one embodiment, the topic model 114 can include a list of important people, organizations, and keywords. Generally, the data aggregation component 106 can be configured to aggregate data and/or compile a set of relevant key observations from the data.

The scenario projection component 110 can include defined hardware (e.g., the processing units 112) configured to automate several program instructions described herein. The scenario projection component 110 can be arranged to receive a risk driver model 116 from an input device, an electronic source, or any suitable source. The risk driver model 116 can also be received from a domain expert, or from another suitable source. According to one embodiment, the risk driver model 116 is a description of the causes and effects for a particular risk driver (e.g., a central concept). The risk driver model 116 can also include one or more content monitoring topics corresponding to a leading indicator of a key risk driver. In this example, the leading indicator is a key risk driver, where as it is a leading indicator of another risk driver that is not necessarily a key risk driver. Thus, a convention is followed where what is presented and selected with the emerging storylines is a key risk driver, and what is in the risk driver model is simply a risk driver. In this framework any of the risk drivers could become a key risk driver as soon as it is shown together with an emerging storyline, or when a particular risk driver is selected. According to some embodiments, the risk driver model 116 can be captured through use of a graphical user interface or another input tool. The graphical user interface can facilitate the encoding of concepts and relations that encompass the risk driver model 116.

The scenario projection component 110 can also be arranged to receive expert selections 118 from an input device, an electronic source, or any suitable source. The expert selections 118 can also be received through the use of a graphical user interface. According to one embodiment, the expert selections can include, but are not limited to, selections of potential likelihoods and impact of a cause or an effect, selections of one or more key risk drivers, selections of one or more leading indicators, or other suitable information. Generally, the scenario projection component 110 can be configured to automatically generate an artificial intelligence planning problem. Additionally, an outcome of the artificial intelligence planning problem can be used to generate a set of alternative and/or projected future scenarios.

The system 100 can be deployed for any organization and can be deployed across any suitable hardware capable of receiving data from the plurality of defined sources 102. According to one embodiment, a defined source can be selected from the group consisting of news sources, web-crawling systems, user postings on social media, and trending topics on social media. Other defined sources are also contemplated, and these examples should not be construed as limiting.

Hereinafter, detailed discussion of definitions and concepts useful for understanding the operation of system 100 are described in detail. Generally, a scenario planning for risk management problem can be represented based on three definitions, provided in Definition 1, Definition 2, and Definition 3, shown below.

Definition 1: An artificial intelligence planning problem is a tuple P=(F, A, I, G), where F is a finite set of fluent symbols, A is a set of actions with preconditions, PRE(a), add effects, ADD(a), delete effects, DEL(a), and action costs, COST(a), I⊆F defines the initial state, and G⊆F defines the goal state.

According to Definition 1, a state, s, is a set of fluents that are true. An action a is executable in a state s if PRE(a)⊆s. The successor state is defined as δ(a, s)=((s\DEL(a)) ∪ ADD (a)) for the executable actions. The sequence of actions $\pi=[a_0, \ldots, a_n]$ is executable in s if state $sf=\delta(a_n, \delta(a_{n-1}, \ldots, \delta(a_0, s)))$ is defined. Moreover, π is the solution to P if it is executable from the initial state and $G \subseteq \delta(a_n, \delta(a_{n-1}, \ldots, \delta(a_0, I)))$.

As relayed in Definition 1, the term "fluents" refers to fluent conditions and/or other conditions that change over time. Fluent conditions are conditions that change over time, and can include a variety of conditions associated with the domain knowledge represented by the graphical representation of domain knowledge 100. These fluent conditions can include, for example, degradation of an object, traffic within a loading dock, weather conditions over a defined geography, and other suitable conditions. Other fluent conditions and/or conditions that change over time are also contemplated, and the examples provided herein are not to be construed as limiting in any manner.

Furthermore, an artificial intelligence plan recognition problem for processing by an artificial intelligence planning and recognition component can be represented as set forth in Definition 2, below.

Definition 2: An artificial intelligence plan recognition problem is a tuple PR=(F, A, I, O, G, PROB), where (F, A, I) is the planning domain as defined in Definition 1 above, O=[o1, ..., om], where oi∈F, i∈[1, m] is the sequence of observations, G is the set of possible goals G, G⊆F, and PROB is the goal priors, P (G).

According to Definition 2, unreliable, unexplainable, or otherwise noisy observations are defined as those that have not been added to the state as a result of an effect of any of the actions in a plan for a particular goal, while missing observations are those that are added to the state but are not observed (i.e., are not part of the observation sequence). To address the noisy observations, the definition of satisfaction of an observation sequence by an action sequence is modified to allow for observations to be left unexplained. Given an execution trace and an action sequence, an observation sequence is said to be satisfied by an action sequence and its execution trace if there is a non-decreasing function that maps the observation indices into the state indices as either explained or discarded.

Definition 3: A scenario planning for risk management problem is defined as a tuple SP=(F, A, I, O, I), where (F, A, I) is the planning domain as defined above, $O=[o_1, \ldots, o_m]$, where of ∈F, i∈[1, m] is an ordered sequence of observations or key drivers, F is a set of goals or business implications G⊆F.

Turning back to FIG. 1, general input to the system 100 can include raw social media posts and news articles, content from the Internet, and/or other information retrievable over the network 104. The data aggregation component 106 can analyze the input data to facilitate generation of a solution to the scenario planning for risk management problem defined above by the scenario projection component 110.

The solution to the scenario planning for risk management problem is defined as a set of scenarios, where each scenario is a collection of plans Π such that: (i) each plan $\pi=[a_0, \ldots, a_i, a_{i+1}, \ldots, a_n]$ is an action sequence that is executable from the initial state I and results in state $s=\delta(a_n, \ldots, \delta(a_0, I))$, (ii) at least one of the goals is met (i.e., ∃G ∈Γ, where G ⊆s), and (iii) the sequence of observations is satisfied by the action sequence $[a_0, \ldots, a_i]$. The scenario planning for risk management problem can be thought of as a plan recognition problem, where observations and a set of goals are given. Rather than computing P(π|O) and P(G|O), the solution to the scenario planning for risk management problem is a set of scenarios showcasing alternative possible outcomes, akin to computing a set of diverse plans.

Accordingly, a framework for determining a solution to a scenario for risk management problem has been defined. Hereinafter, operational characteristics of the system 100 are described in detail beginning with input and capture of domain knowledge via the risk driver model 116.

Generally, knowledge engineering tools assume that a domain expert has some artificial intelligence planning background. However, according to some embodiments, the disadvantage of unknowledgeable domain experts in artificial intelligence planning is circumvented through intelligent acquisition of domain knowledge in an automated manner. For example, according to some embodiments, a domain expert can express the knowledge in a light-weight graphical user interface and the system 100 (e.g., the scenario projection component 110) can automatically translate the domain knowledge. The form of encoded domain knowledge and translation is explained below.

As shown in FIG. 1, domain knowledge can be received as risk driver model 116 and expert selections 118. For example, the risk driver model 116 can include domain knowledge corresponding to the causes and effects of the different risk drivers influencing the risks in an organization (e.g., the economy, currency, politics, and/or social unrest). A mind map is a graphical representation of the domain knowledge that can be used to express the risk driver model in a simplified manner Hereinafter, the capture of domain knowledge in an automated manner using a graphical representation of domain knowledge is described in detail with reference to FIG. 6.

Figure 6:
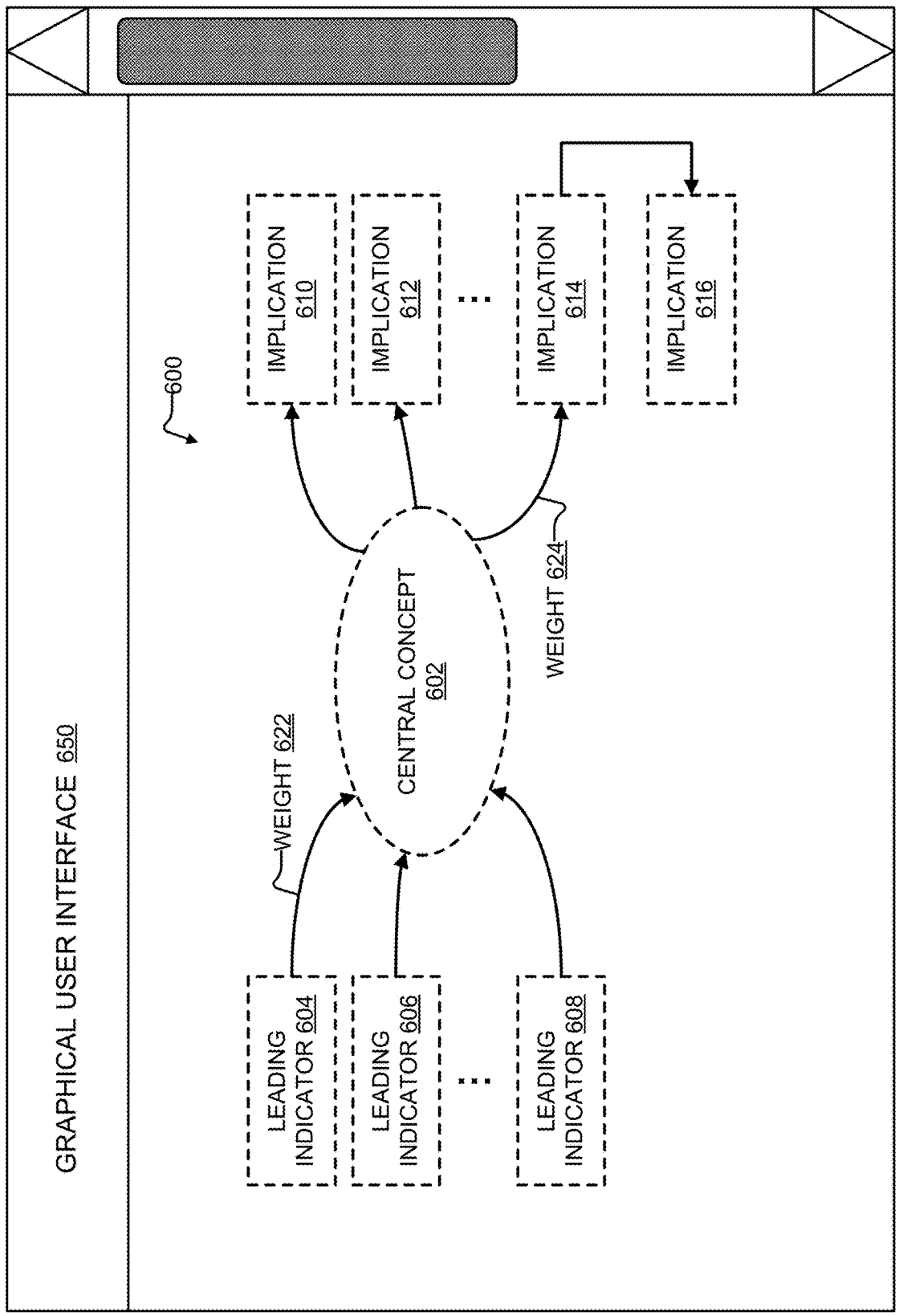
FIG. 6 illustrates a block diagram of an example, non-limiting graphical user interface in accordance with one or more embodiments of the disclosed subject matter.

FIG. 6 illustrates a block diagram of an example, non-limiting graphical user interface 650 in accordance with one or more embodiments of the disclosed subject matter. As illustrated, the graphical user interface 650 can include a graphical representation of domain knowledge 600, presented for and editable by a user. The graphical user interface 650 can be generated by a processing device and presented via an output device such as, for example, a computer monitor or other display device. Repetitive description of like elements employed in other embodiments described herein is omitted for the sake of brevity.

The graphical representation of domain knowledge 600 can comprise a central concept 602, leading indicator 604, leading indicator 606, leading indicator 608, implication 610, implication 612, and implication 614. The graphical representation of domain knowledge 600 can further comprise implication 616 associated with implication 616, weight 622 associated with leading indicator 604, and weight 624 associated with implication 614.

It should be understood that the particular arrangement of the graphical representation of domain knowledge 600 can change according to associated domain knowledge. For example, more or fewer leading indicators, weights, and/or implications can be included according to any particular implementation and associated domain knowledge. Additionally, more or fewer weights associated with any number of leading indicators and/or implications can also be applicable. Accordingly, the particular form of the graphical representation of domain knowledge 600 should not be considered limiting in any way.

As shown in FIG. 6, the central concept 602 is a general concept representative of a risk driver in an associated domain. For example, a possible risk driver can include a "low oil price". Other possible risk drivers can also be applicable to particular domains. Accordingly, exhaustive description of a plurality of different risk drivers and central concepts is omitted herein for the sake of brevity. Generally, through manipulation of the graphical user interface 650, the central concept 602 can be manipulated, altered, changed, and/or updated.

As further shown in FIG. 6, there are several arrows providing for directionality to and from the central concept 602. From the arrows, several traits of the domain knowledge can be inferred. For example, arrows directed towards the central concept 602 can be indicative of a source concept being a "leading indicator". Furthermore, arrows directed from the central concept 602 can be indicative of a possible "implication". Moreover, several concepts can be tied together to establish a chain of events leading to or from the central concept in any desirable manner Thus, the particular arrangements of arrows illustrated in FIG. 6 are merely examples of one possible graphical representation of particular domain knowledge, and therefore should not be construed as limiting. Generally, through manipulation of the graphical user interface 650, the arrows can be manipulated, altered, changed, and/or updated.

As further shown in FIG. 6, the central concept 602 can be associated with leading indicator 604, leading indicator 606, and leading indicator 608. The leading indicators can represent a portion of the domain knowledge of the graphical representation of domain knowledge 600. The leading indicators can comprise concepts that can affect the central concept 602. For example, and without limitation, continuing the example of a central concept of a "low oil price," a possible leading indicator can include a "warmer than normal winter in the northern hemisphere." Thus, if this leading indicator were true, a resulting implication may result that affects the central concept. Generally, through manipulation of the graphical user interface 650, the leading indicators can be manipulated, altered, changed, and/or updated.

As further shown in FIG. 6, the central concept 602 can be associated with implication 610, implication 612, and implication 614. Additionally, implication 616 can be associated with implication 614. The implications may represent a portion of the domain knowledge of the graphical representation of domain knowledge 600. The implications can include concepts or implications affected by the leading indicators and any possible occurrence. For example, and without limitation, continuing the example of a central concept of a "low oil price," a possible implication can include "oil prices continue to rise." Thus, if the example leading indicator of a "warmer than normal winter in the northern hemisphere" were true, the possible implication of "oil prices continue to rise" may also be true as an implication of the leading indicator and central concept. Furthermore, as illustrated in FIG. 6, under some circumstances, implication 616 may result as a link in a chain of events beginning with a particular leading indicator being true, that particular leading indicator causing implication 614, and implication 614 therefore causing implication 616. Other chains of events can also be applicable under some circumstances. Furthermore, through manipulation of the graphical user interface 650, the implications can be manipulated, altered, changed, and/or updated.

As further shown in FIG. 6, leading indicator 604 can include a weight 622 associated the leading indicator 604. Additionally, the implication 614 can include a weight 624 associated with the implication 614. Generally, the weight 622 and the weight 624 can represent an action cost or other similar attribute. The action cost can indicate a cost of performing an action associated with the leading indicator 604 and/or the implication 614. Furthermore, although not illustrated for clarity, according to at least one embodiment, every leading indicator can include an associated weight or cost. Additionally, according to at least one embodiment, every implication can include an associated weight or cost. Similarly, according to some embodiments, at least one or more leading indicators does not have an associated weight or cost. Moreover, according to some embodiments, at least one or more implications does not have an associated weight or cost. Additionally, through manipulation of the graphical user interface 650, the weights can be manipulated, altered, changed, and/or updated. Thus, the particular arrangement of the graphical representation of domain knowledge 600 can be varied and manipulated in many ways.

As described above, the graphical representation of domain knowledge 600 captures domain knowledge from experts and/or other users. The domain knowledge encoded through manipulation of the graphical user interface 650 can also be automatically translated into an artificial intelligence description language. For example, an action can be defined for each cause, as well as each edge in the graphical representation of domain knowledge 600. The translation can be performed on-the-fly through use of the graphical user interface 650, or can be post-processed (e.g., through the scenario projection component 110).

In order to use artificial intelligence planning to determine a solution to the scenario planning for risk management problem, observations are compiled away. To do so a set of "explain" and "discard" actions can be added for each observation. The discard action can be selected in order to leave some observations unexplained. To encourage an artificial intelligence planning and recognition component to generate plans that explain as many observations as possible, a penalty is given for the "discard" action in the form of costs. The penalty is relative to the cost of the other action in the domain. To compute a set of high-quality plans, a top-k planning approach can be implemented. Top-k planning is defined in as the problem of finding k set of plans that have the highest quality. A known algorithm to compute the set of top-k plans is based on the k shortest paths algorithm called $K^L$ which also allows use of heuristics search. The $K^L$ algorithm together with the LM-cut heuristic can be implemented in the system 100 of FIG. 1 (e.g., through scenario projection component 110).

Hereinafter, post-processing of the domain knowledge generation of possible future scenarios that can be facilitated by the system 100 is described in detail.

To compute possible future scenarios, a set of post-processing steps on the computed set of plans can be performed by the system 100. Initially, a set of unique plans is determined. For the purpose of scenario planning, predicates directly derived from the concepts of the risk driver model 116 and/or the graphical representation of domain knowledge 600 are retained. Therefore, plans that are distinct to an implemented artificial intelligence planner and recognition component can be considered equivalent for scenario planning purposes.

Responsive to generating the unique plans, the resulting plans can be clustered as described above to create possible future scenarios. The plans can be clustered according to the predicates present in the last state as encoded in the risk driver model 116. Since the number of ground predicates is generally finite, each plan can be identified through a bit array of the same size as the number of ground predicates, in which "1" indicates the predicate is present. To determine the Euclidian distance between two plans, a logical OR can be computed of the corresponding bit arrays and the square root of the number of "1" bits can be computed.

With this distance, a case of "opposite" predicates (e.g., weakening/strengthening economic environment, increase/decrease in inflation, etc.) is contended. To ensure avoidance of plans with opposite predicates ending up in the same cluster, a penalty factor is added to the number of "1" bits utilized to compute the distance for every pair of opposite predicates found in the plans. Given this distance function, a dendrogram bottom-up is computed using the complete-linkage clustering method with the mean of all distances between clusters as the aggregate function. A user can specify a minimum and maximum consumable number of scenarios using the graphical user interfaces and input devices described herein. The specified minimum and maximum settings can be used to perform a cut through the dendrogram that yields a number of clusters in the given interval and has the optimal Dunn index.

After post-processing is complete, several tasks can be performed to prepare the projected future scenarios for presentation. Predicates can be separated in each cluster (e.g., projected scenario) into implications and regular predicates. At the same time, probable and possible predicates can be separated in each of these categories by determining the proportion of plans where the predicate is present in the last state from all plans in the scenario. Additionally, a set of leading indicators can be computed based on the risk driver model 116. The computed set of leading indicators are predicates that appear early on the plans that are part of one scenario and are also discriminating (i.e., they tend to lead to this scenario and not others). The computed set of leading indicators is useful to monitor in order to determine early on whether a projected scenario is likely to occur. Additionally, a summary of all plans that are part of the current projected scenario can be output as future scenario data 120.

As described above, the system 100 can include a data aggregation component 106 in electrical communication with a scenario projection component 110. Furthermore, the system 100 can be configured to perform several methodologies to compute solutions to a scenario planning for risk management problem and output one or more projected future scenarios. Hereinafter, additional embodiments of systems and methods of scenario planning are described in detail.

Figure 2:
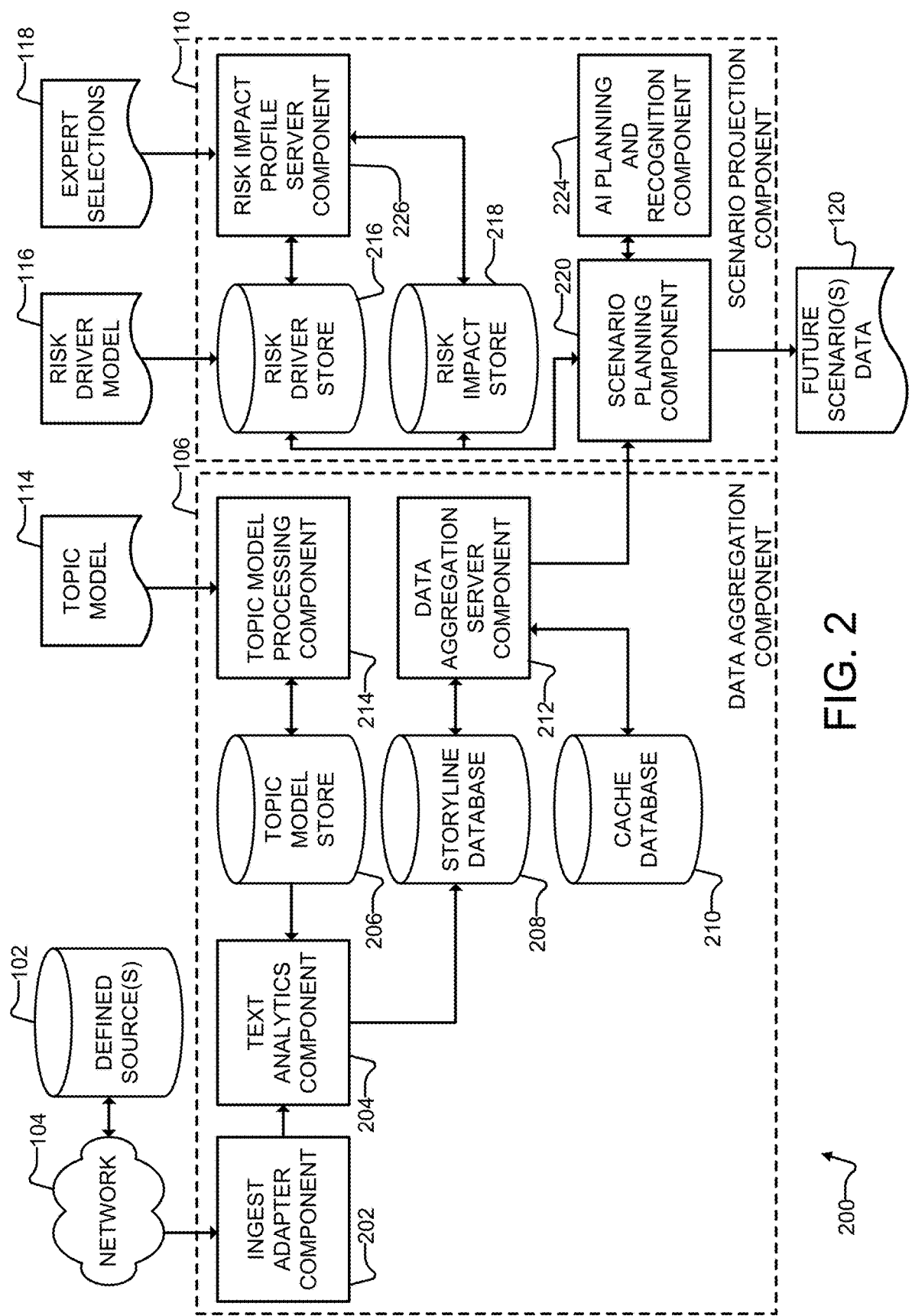
FIG. 2 illustrates a block diagram of an example, non-limiting system that can provide scenario planning in accordance with one or more embodiments of the disclosed subject matter.

Turning back to the drawings, FIG. 2 illustrates a block diagram of an example, non-limiting system 200 that can provide scenario planning in accordance with one or more embodiments of the disclosed subject matter. The system 200 can include the data aggregation component 106 in electrical communication with the scenario projection component 110, and other elements similar to system 100. As further illustrated, the data aggregation component 106 can be arranged to include an ingest adapter component 202, a text analytics component 204 in electrical communication with the ingest adapter component 202, a topic model store 206 in electrical communication with the text analytics component 204, a storyline database 208 in electrical communication with the text analytics component 204, a topic model processing component 214 in electrical communication with the topic model store 206, a data aggregation server component 212 in electrical communication with the storyline database 208, and a cache database 210 in electrical communication with the data aggregation server component 212. Furthermore, the scenario projection component 110 can be arranged to include a risk driver store 216, a risk impact profile server component 226 in electrical communication with the risk driver store 216, a risk impact store in communication with the risk profile server component 226, a scenario planning component 220 in electrical communication with the risk driver store 216, and an artificial intelligence planning and recognition component 224 in electrical communication with the scenario planning component 220. Additionally, the scenario planning component 220 can be in electrical communication with the risk impact store 218 and the data aggregation component 106. Repetitive description of like elements employed in other embodiments described herein is omitted for the sake of brevity.

According to one or more embodiments, the ingest adapter component 202, the text analytics component 204, the topic model processing component 214, and the data aggregation server component 212, can be arranged to perform any of the functionality described above with reference to the data aggregation component 106. Furthermore, according to one or more embodiments, the ingest adapter component 202, the text analytics component 204, the topic model processing component 214, and the data aggregation server component 212 can also be implemented as a discrete set of program instructions that implement any portion of the described methodologies in any ordered sequence.

According to one or more embodiments, the topic model store 206, the storyline database 208, the cache database 210, the risk driver store 216, and the risk impact store 218 can be arranged as database components or storage components. Additionally, the topic model store 206, the storyline database 208, the cache database 210, the risk driver store 216, and the risk impact store 218 can be arranged as discrete storage components on a single or multiple storage media.

According to one or more embodiments, the risk impact profile server component 226, the scenario planning component 220, and the artificial intelligence planning and recognition component 224 can be arranged to perform any of the functionality described above with reference to the scenario projection component 110. Furthermore, according to one or more embodiments, the risk impact profile server component 226, the scenario planning component 220, and the artificial intelligence planning and recognition component 224 can also be implemented as a discrete set of program instructions that implement any portion of the described methodologies in any ordered sequence.

With reference to the system 200, a scenario planning methodology can be executed that can generate one or more future scenarios useful in risk management. For example, the one or more future scenarios can be generated generally as described above. Hereinafter, a more detailed description of the operation of the system 200 is provided.

In scenario planning as described herein, it can be beneficial to utilize and leverage knowledge provided by experts as well as content from one or more defined sources. For example, one or more domain experts can create a risk driver model 116 by describing risk drivers driving the domain and their effects and leading indicators, and assessing risk driver impact in different regions. The risk driver model 116 can be stored at the risk driver store 216. Furthermore, the risk driver model 116 can be processed by the risk impact profile server component 226 to determine any associated risk impact or risk impacts. The associated risk impact or risk impacts can be stored at the risk impact store 218.

Additionally, domain experts can create the topic model 114. The topic model 114 can describe key people and/or organizations that are able to influence at least one key risk driver identified in the risk driver model 116. The topic model 114 can also describe topics, key words, and/or other metadata for monitoring as related to the risk driver model 116. The topic model 114 can be processed by the topic model processing component 214. Furthermore, the topic model 114 can be stored at the topic model store 206.

Responsive to processing and storing the topic model 114 and/or the risk driver model 116, data from the network 104 can be continuously ingested by the ingest adapter component 202. Responsive to the continuous ingestion, the text analytics component 204 can analyze and process the ingested data. For example, the text analytics component 204 can be arranged to continuously analyze data received from the defined sources 102. Furthermore, the text analytics component 204 can locate emerging storylines based on the topic model 114.

Responsive to locating the emerging storylines, the text analytics component 204 can be arranged to store the emerging storylines at the storyline database 208. The data aggregation server component 212 can be arranged to access the stored emerging storylines from the storyline database 208. The data aggregation server component 212 can also be arranged to aggregate the retrieved emerging storylines based on the topic model 114 and/or the risk driver model 116. Responsive to aggregation of the emerging storylines, the data aggregation server component 212 can cache assembled data at the cache database 210, and present the cached data for review by domain experts and/or analysts. For example, domain experts and/or analysts can review the aggregated storylines and select key risk drivers (e.g., as expert selections 118) describing their observations.

Upon receiving expert selections 118, the scenario planning component 220 can generate future scenario data 120. For example, scenario planning component 220 can generate possible future scenarios, based on a current situation and the risk impact model 116, taking into account regional risk driver impact as accessible at the risk impact store 218. Furthermore, the artificial intelligence planning and recognition component 224 can operate as described above with reference to Definition 1, Definition 2, and Definition 3. Therefore, the scenario planning component 220, using information received from the artificial intelligence planning and recognition component 224, can provide one or more future scenarios for further review, refinement, and risk analysis. Upon receipt of the future scenario data 120, the domain experts and/or analysts can review the generated scenarios and recommend actions based on the generated scenarios. For example, the domain experts and/or analysts can provide additional expert selections 118 via a graphical user interface, can review the future scenario data 120 via a graphical user interface, and/or can refine the risk driver model 116 and topic model 114 via a graphical user interface.

Through these interactions, the system 200 facilitates a robust solution to scenario planning with many benefits. For example, through repeated interactions with domain experts and analysts, the future scenario data 120 can be refined based on current events and observations made by the domain experts and/or analysts. Additionally, the ingest adapter 202 and the text analytics component 204 can continually monitor the defined sources 102 to provide up-to-date information on emerging trends. Thus, according to some embodiments, the future scenarios data 120 overcomes drawbacks associated with mere historical analysis while also improving accuracy and reducing computation time for similar analyses.

Hereinafter, a more detailed explanation of the operation of the system 100 and the system 200 is presented with discussion of computer-implemented methodologies that can be executed by the system 100 and/or the system 200.

Figure 3:
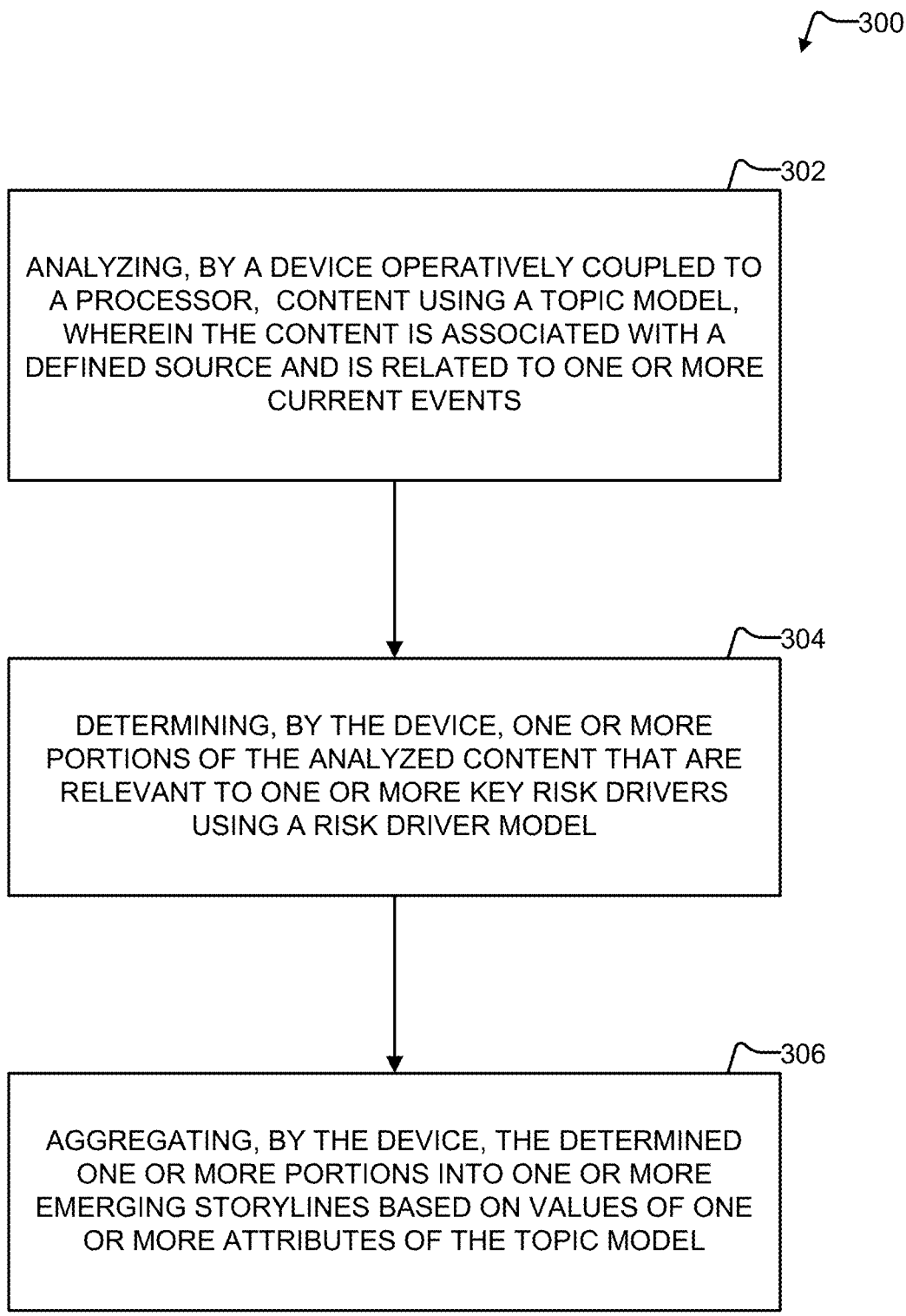
FIG. 3 illustrates a flowchart of an example, non-limiting computer-implemented method of scenario planning in accordance with one or more embodiments of the disclosed subject matter.

FIG. 3 illustrates a flowchart of an example, non-limiting computer-implemented method 300 of scenario planning in accordance with one or more embodiments of the disclosed subject matter. The computer implemented method 300 can include, for example, a sequence of program instructions to be performed by a data aggregation component, such as the data aggregation component 106. The computer implemented method 300 can include, but is not limited to, blocks 302, 304, and 306. Repetitive description of like elements employed in other embodiments described herein is omitted for the sake of brevity.

According to one embodiment, the computer-implemented method 300 can include analyzing, by a device operatively coupled to a processor, content using a topic model, at block 302 (e.g., by the data aggregation component 106). The content can be associated with a defined source and can be related to one or more current events. For example, the topic model can be topic model 114 and the content can be retrieved or received from a plurality of defined sources 102. Accordingly, when processed by the data aggregation component 106, the analyzing of the content from the plurality of defined sources 102 is performed in a rapid and accurate manner (e.g., greater than the capability of a single human mind). For example, an amount of data processed, a speed of processing of data and/or data types processed by the data aggregation component over a certain period of time can be greater, faster and different than an amount, speed and data type that can be processed by a single human mind over the same period of time.

The computer-implemented method 300 can further include determining, by the device, one or more portions of the analyzed content that are relevant to one or more key risk drivers using a risk driver model, at block 304 (e.g., by the data aggregation component 106). In this example, topics from the topic model can be used in making decisions about candidate key risk drivers that are relevant. For example, relevant key risk drivers for the received content can be determined based on topics that are associated with the content by applying the topic model. In following this example, topics that can result from applying the topic model to the content can be used to suggest candidate key risk drivers for selection, where candidate key risk drivers can be presented for selection via a graphical user interface, and the selection can be used to generate future scenarios.

The computer-implemented method 300 can also include aggregating, by the device, the determined one or more portions into one or more emerging storylines based on values of one or more attributes of the topic model, at block 306 (e.g., by the data aggregation component 106). According to one embodiment, the aggregating can include combining the one or more emerging storylines with one or more attributes extracted from the content. It is noted that, when processed by the data aggregation component 106, the aggregating of the determined one or more portions into one or more emerging storylines is handled in a rapid and accurate manner (e.g., is greater than the capability of a single human mind). For example, an amount of data processed, a speed of processing of data and/or data types processed by the data aggregation component over a certain period of time can be greater, faster and different than an amount, speed and data type that can be processed by a single human mind over the same period of time.

Figure 4:
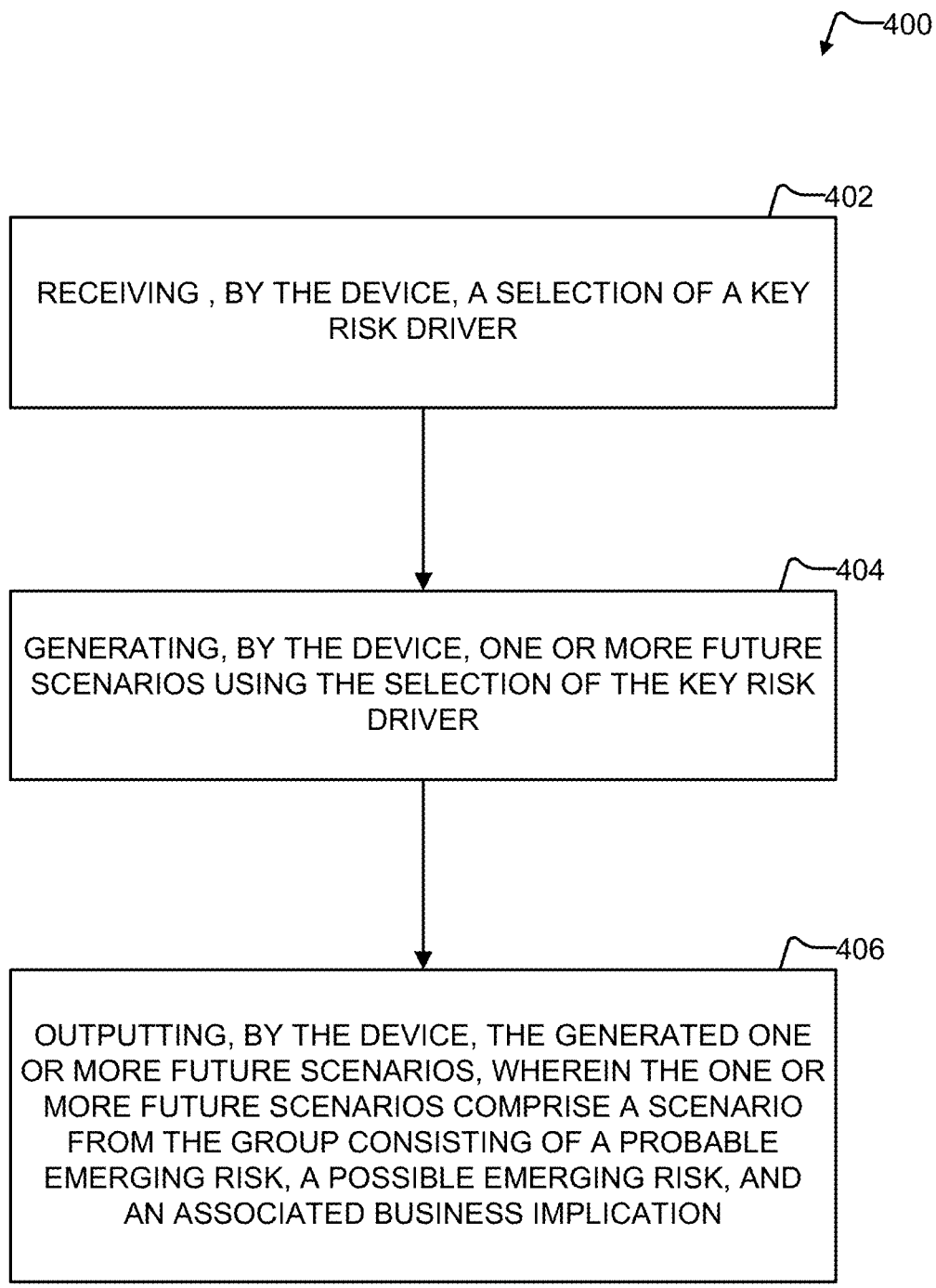
FIG. 4 illustrates a flowchart of an example, non-limiting computer-implemented method of scenario planning in accordance with one or more embodiments of the disclosed subject matter.

Generally, the emerging storylines can include data related to the one or more current events, and other data collected and/or received from the plurality of defined sources 102. This data can be processed based on the risk driver model 116 to generate future scenario data 120. Accordingly, embodiments that include data collected and/or received from the plurality of defined sources 102 take into consideration and analyze current trends, current information, current news, current key risk drivers, expert knowledge, expert observations, expert feedback, and other related attributes to develop and predict future scenarios that go beyond mere historical analysis. Furthermore, the future scenario data 120 can be refined based on expert selections 118. FIG. 4 illustrates a flowchart of an example, non-limiting computer-implemented method 400 of scenario planning in accordance with one or more embodiments of the disclosed subject matter. The computer implemented method 400 can include, for example, a sequence of program instructions to be performed by a scenario projection component, such as the scenario projection component 110. The computer implemented method 400 can include, but is not limited to, blocks 402, 404, and 406. Repetitive description of like elements employed in other embodiments described herein is omitted for the sake of brevity.

The computer-implemented method 400 can include receiving, by the device, a selection of a key risk driver at block 402 (by the scenario projection component 110). The selection of the key risk driver can include expert selections 118, for example. Furthermore, the selection of the key risk driver can include other selections or more than one selection of a key risk driver. According to at least one embodiment, a second key risk driver can also be received. Thus, according to embodiments including a selection of a key risk driver (e.g., block 402), expert feedback can be continuously received, and can result in increased accuracy of provided results.

Responsive to block 402, the computer-implemented method 400 can include generating, by the device, one or more future scenarios using the selection of the key risk driver, at block 404 (e.g., by the scenario projection component 110). For example, the scenario projection component 110 can process the risk driver model 116 and utilize the artificial intelligence planning and recognition component 224 to generate the one or more future scenarios as described in detail above. Therefore, according to embodiments that include generating one or more future scenarios using the selection of the key risk driver (e.g., block 404), expert feedback is used to generate a more accurate one or more future scenarios for risk management. Furthermore, when processed by the scenario projection component, the generation of the future scenario data 120 occurs in a rapid manner (e.g., is greater than the capability of a single human mind). For example, an amount of data processed, a speed of processing of data and/or data types processed by the scenario projection component over a certain period of time can be greater, faster and different than an amount, speed and data type that can be processed by a single human mind over the same period of time.

Responsive to block 404, the computer-implemented method 400 can also include outputting, by the device, the generated one or more future scenarios (e.g., by the scenario projection component 106). As noted above, the generation of one or more emerging storylines and outputting of the generated one or more future scenarios is beneficial in that feedback can be received from domain experts and/or analysts. Therefore, the future scenario data 120 can be refined to increase accuracy of predictions.

Figure 5A:
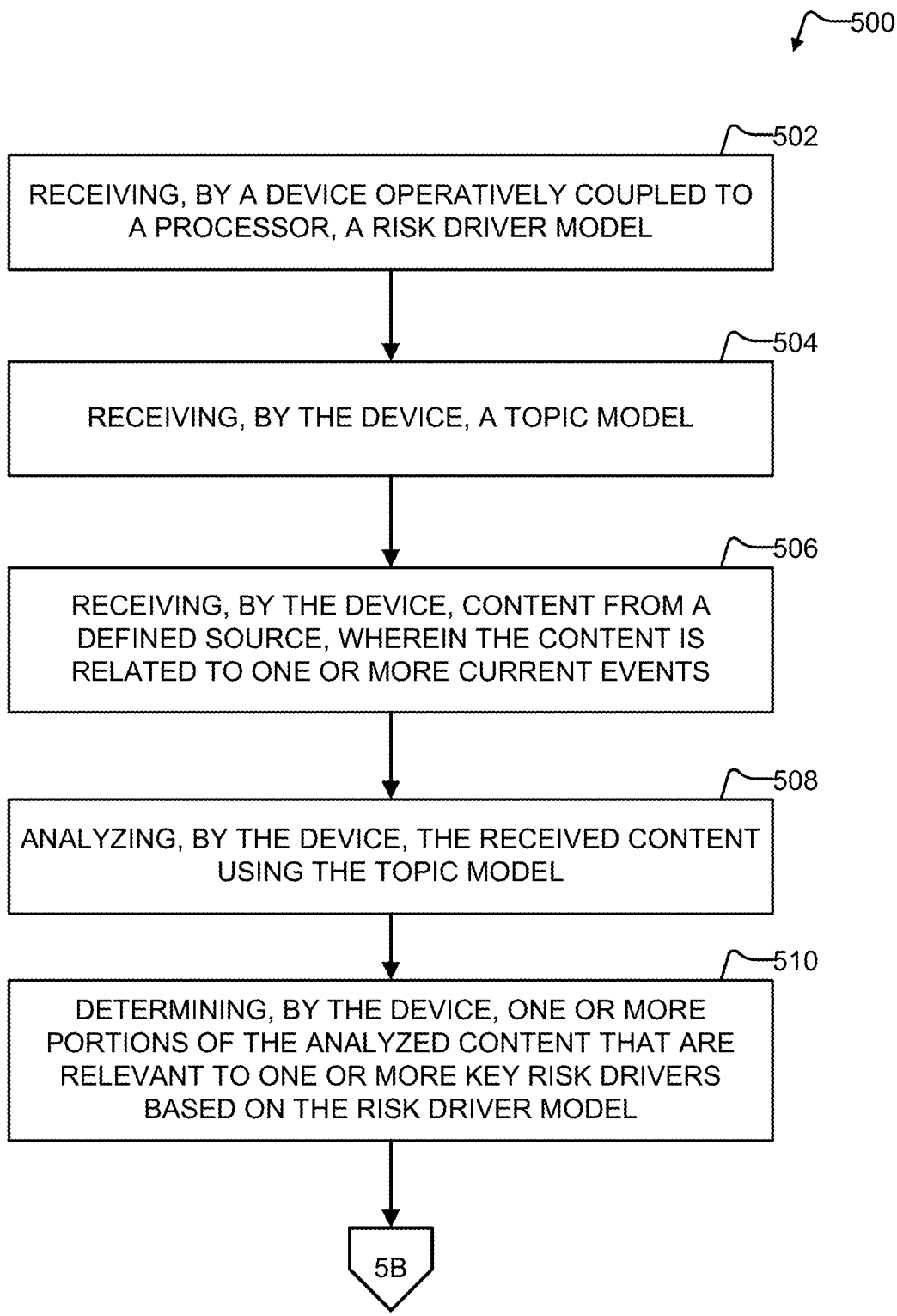
FIGS. 5A and 5B illustrate a flowchart of an example, non-limiting computer-implemented method of scenario planning in accordance with one or more embodiments of the disclosed subject matter.
Figure 5B:
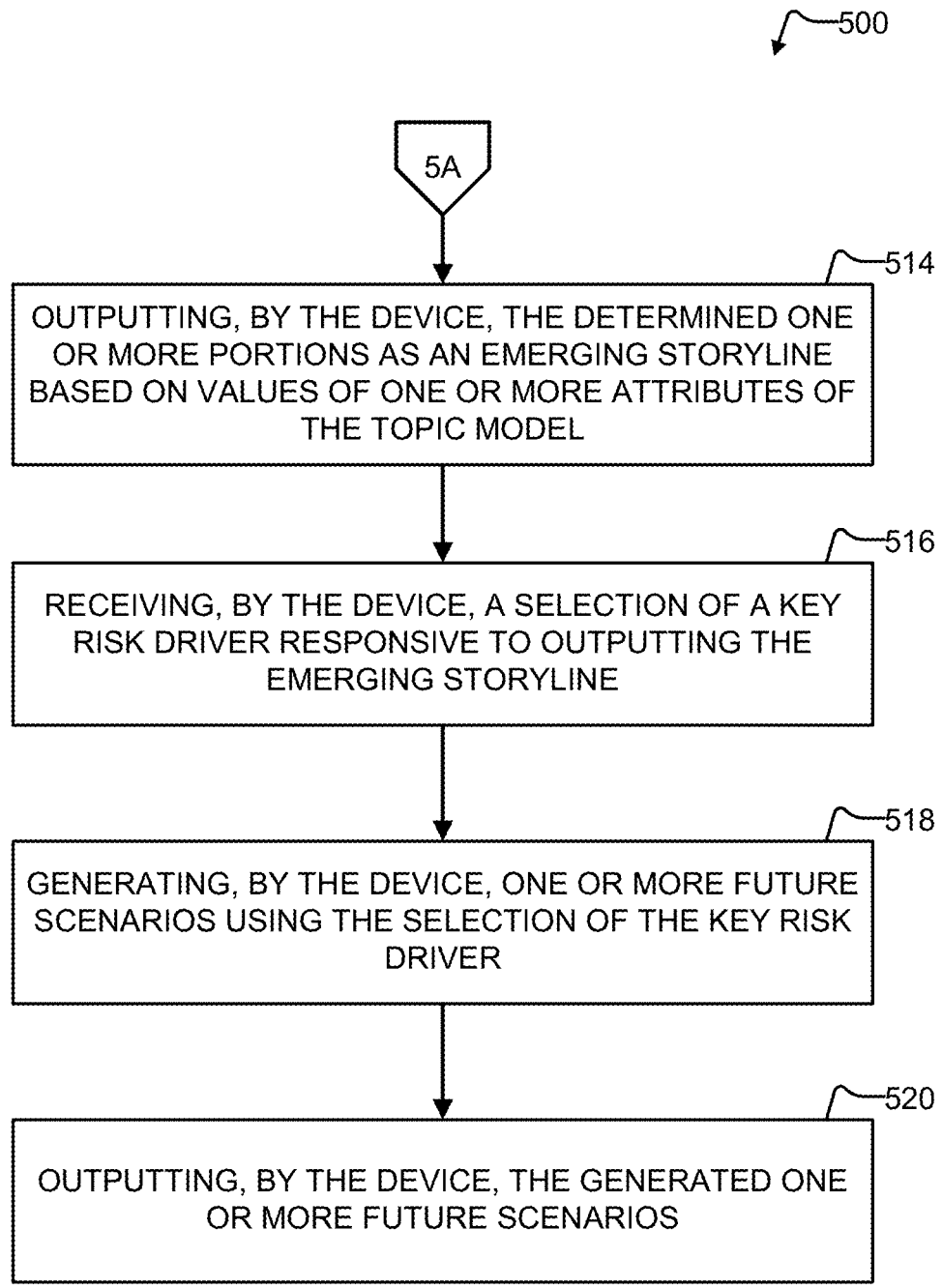

For example, and without limitation, iterative refinement of future scenario data 120 can be facilitated by the system 100 or the system 200. Such iterative refinement is beneficial in that more accurate portrayals of risk management issues are now possible. FIGS. 5A and 5B illustrate a flowchart of an example, non-limiting computer-implemented method 500 of scenario planning in accordance with one or more embodiments of the disclosed subject matter. The computer implemented method 500 can include, for example, a sequence of program instructions to be performed by a data aggregation component and a scenario projection component, such as the data aggregation component 106 and the scenario projection component 110. The computer implemented method 500 can include, but is not limited to, blocks 502, 504, 506, 508, 510, 514, 516, 518, and 520. Repetitive description of like elements employed in other embodiments described herein is omitted for the sake of brevity.

The computer-implemented method 500 can include receiving, by a device operatively coupled to a processor, a risk driver model, at block 502 (e.g., by the scenario projection component 110). For example, the risk driver model can be risk driver model 116. Generally, the risk driver model can be created by an expert. For example, the domain expert can create a list of key risk driver based on knowledge of the domain, identify leading indicators, effects, and business implications for each key risk driver, and define monitoring topics corresponding to the leading indicators of the risk drivers.

The computer-implemented method 500 can also include receiving, by the device, a topic model, at block 504 (e.g., by the data aggregation component 106). For example, the topic model can be the topic model 114. Generally, the topic model can also be created by an expert. For example, the domain expert can provide a list of desired defined sources 102, provide a list of key people and key organizations that are able to influence the key risk drivers, and provide a list of keywords for monitoring topics that are identified in the risk driver model.

An approval workflow for the topic model can also be implemented by an analyst or any other person familiar with the system to review and revise the changes to the elements of the topic model (e.g., people, organizations, and topic keywords), when these changes are made by a domain expert or an analyst, in order to implement improvements to the topic model required to optimize news analysis performance. For example, the analyst can create a topic model template, based on the risk driver model, and include sample elements of the topic model, including sample and preconfigured sources, topics, keywords, organizations and people. The template can be used for collecting further input related to elements of the topic model. Upon collecting the further input, the further input can be reviewed and modified as required to improve analysis of content from the defined sources. Additionally, the analyst can approve any final revisions to the topic model for input and provide the most recent approved topic mode for use with the computer-implemented method 500.

In addition to the approval workflow described above, separate machine learning techniques can be applied to the topic model for further improvements. For example, an external knowledge corpus can be analyzed. The external knowledge corpus can include historical data including historical data stores for the plurality of defined sources 102. This external knowledge corpus can then be analyzed by applying machine learning, data mining, or other statistical techniques, and using keywords provided in the original topic model, in order to derive new keywords, or names of people or organizations for inclusion in the topic model 114. Other additions and enhancements can also be applicable. Accordingly, these examples are not to be construed as limiting.

Turning back to FIG. 5, the computer-implemented method 500 can also include receiving, by the device, content from a defined source, at block 506 (e.g., by the data aggregation component 106). For example, the content is related to one or more current events and the defined source can be one or more of the plurality of defined sources 102.

Responsive to block 506, the computer-implemented method 500 can include analyzing, by the device, the received content using the topic model, at block 508 (e.g., by the data aggregation component 106). As described above, the analyzing can be performed in a rapid, real-time, or almost real-time manner (e.g., is greater than the capability of a single human mind). For example, an amount of data processed, a speed of processing of data and/or data types processed by the data aggregation component over a certain period of time can be greater, faster and different than an amount, speed and data type that can be processed by a single human mind over the same period of time.

Responsive to block 508, the computer-implemented method 500 can include determining, by the device, one or more portions of the analyzed content that are relevant to one or more key risk drivers based on the risk driver model, at block 510 (e.g., by the data aggregation component 106). The computer-implemented method 500 can further include outputting, by the device, the determined one or more portions as an emerging storyline based on values of one or more attributes of the topic model, at block 514 (e.g., by the data aggregation component 106). As described above, processing to generate an emerging storyline and/or emerging storylines is complex and based on the topic model 114. Accordingly, when processed by the data aggregation component 106, the generation of the emerging storyline takes into consideration the plurality of defined sources 102, the topic model 114, and/or the risk impact model 116 (e.g., is greater than the capability of a single human mind). For example, an amount of data processed, a speed of processing of data and/or data types processed by the data aggregation component over a certain period of time can be greater, faster and different than an amount, speed and data type that can be processed by a single human mind over the same period of time.

Responsive to outputting the emerging storylines, an analyst or domain expert can review the emerging storylines and provide feedback. For example, the analyst can review the emerging storyline or emerging storylines provided by the system 100 or the system 200. The analyst can also select relevant key risk drivers or leading indicators from a candidate list associated with the emerging storylines. The analyst can also review and revise any selections of key risk drivers and leading indicators based on their understanding of the current situation.

Responsive to block 514, the computer-implemented method 500 can include receiving, by the device, a selection of a key risk driver responsive to outputting the emerging storyline, at block 516 (e.g., by scenario projection component 110). The computer-implemented method 500 can also include generating, by the device, one or more future scenarios using the selection of the key risk driver, at block 518 (e.g., by scenario projection component 110). The computer-implemented method 500 can also include outputting, by the device, the generated one or more future scenarios, at block 520 (e.g., by scenario projection component 110).

Responsive to the outputting from block 520, an analyst or domain expert can further refine the generated scenarios through iteration of any of the above methodologies. For example, an analyst can review the outputted one or more future scenarios, and iterate through the above described blocks to refine the one or more future scenarios. If any particular scenario is of interest or is determined to be accurate, the analyst can also prepare a final assessment of emerging risk and recommend risk mitigation actions.

According to at least one embodiment, the computer-implemented method 500 can also include receiving a selection of a second key risk driver responsive to the outputted one or more future scenarios, refining the generated one or more future scenarios based on the second key risk driver into a new set of one or more future scenarios, and outputting the new set of one or more future scenarios. In this example, the iterative refinement based on the selection of the second key risk driver can result in benefits including improved accuracy with a relatively small increase in processing time.

According to an additional embodiment, the generated one or more future scenarios comprise a first future scenario, and the computer-implemented method 500 further includes iteratively refining the first future scenario based on received feedback to create a refined future scenario. In this example, the refined future scenario is indicative of emerging risk. Thus, when the computer-implemented method 500 includes the iteratively refining the first future scenario, the first future scenario takes into consideration the received feedback and observations of domain experts, and can result in further improved accuracy.

As described above, several computer-implemented methods for scenario planning have been provided. The computer-implemented methods can be executed by individual components described in detail herein. Additionally, the computer-implemented methods can be encoded as program instructions on a computer readable storage medium, a computer program product, and/or other articles of manufacture. As further described above, graphical user interfaces can be provided to facilitate interactions between the system 100, the system 200, and/or domain experts and analysts.

Figure 7:
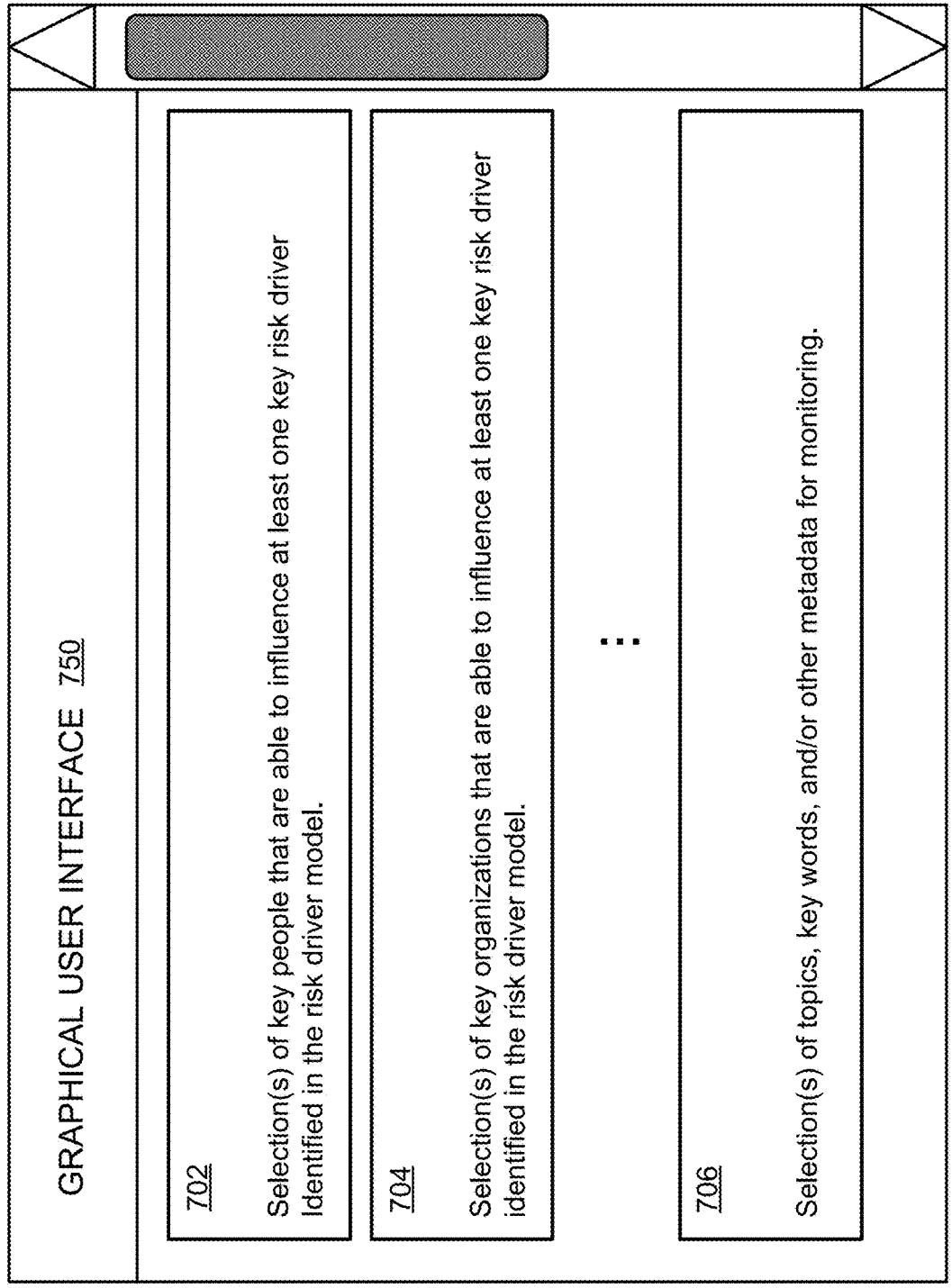
FIG. 7 illustrates a block diagram of an example, non-limiting graphical user interface in accordance with one or more embodiments of the disclosed subject matter.

FIG. 7 illustrates a block diagram of an example, non-limiting graphical user interface in accordance with one or more embodiments of the disclosed subject matter. As illustrated, the graphical user interface 750 can include portion 702, portion 704, and/or portion 706, presented for and editable by a user. The graphical user interface 750 can be generated by a processing device and presented via an output device such as, for example, a computer monitor or other presentation device. Repetitive description of like elements employed in other embodiments described herein is omitted for the sake of brevity.

Generally, the graphical user interface 750 is arranged as a topic model user interface to facilitate generation, editing, and receipt of topic model 114 or other suitable topic models. For example, the portion 702 can include user interface components for selection of key people that are able to influence at least one key risk driver identified in the risk driver model. Furthermore, the portion 704 can include user interface components for selection of key organizations that are able to influence at least one key risk driver identified in the risk driver model. Furthermore, the portion 706 can include user interface components for selection of topics, key words, and/or other metadata for monitoring. It is noted that the particular arrangement of the portions of graphical user interface 750 is non-limiting, and that the graphical user interface 750 can take multiple other forms.

Figure 8:
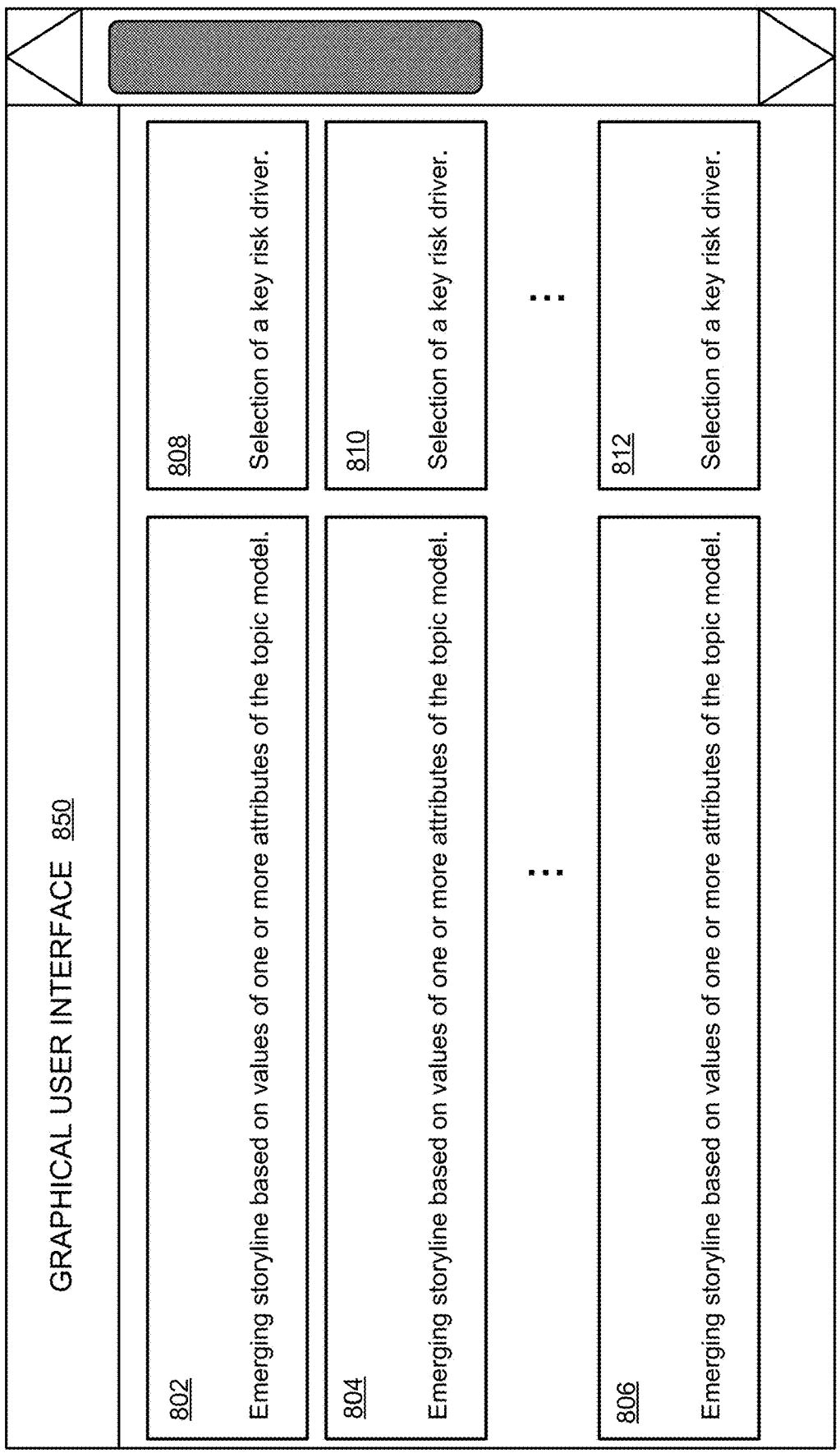
FIG. 8 illustrates a block diagram of an example, non-limiting graphical user interface in accordance with one or more embodiments of the disclosed subject matter.

FIG. 8 illustrates a block diagram of an example, non-limiting graphical user interface in accordance with one or more embodiments of the disclosed subject matter. As illustrated, the graphical user interface 850 can include portion 802, portion 804, portion 806, portion 808, portion 810, and portion 812, presented for and editable by a user. The graphical user interface 850 can be generated by a processing device and presented via an output device such as, for example, a computer monitor or other presentation device. Repetitive description of like elements employed in other embodiments described herein is omitted for the sake of brevity.

Generally, the graphical user interface 850 is arranged as an emerging storyline user interface to facilitate presentation of emerging storylines and receipt of expert selections. For example, the portion 802, the portion 804, and the portion 806 can present one or more emerging storylines based on values of one or more attributes of the topic model. Furthermore, the portion 808, the portion 810, and the portion 812 can include user interface components for selection of a key risk driver for expert selections 118. In at least one embodiment, candidate key risk drivers can also be presented through the portion 812. It is noted that the particular arrangement of the portions of graphical user interface 850 is non-limiting, and that the graphical user interface 850 can take multiple other forms.

Figure 9:
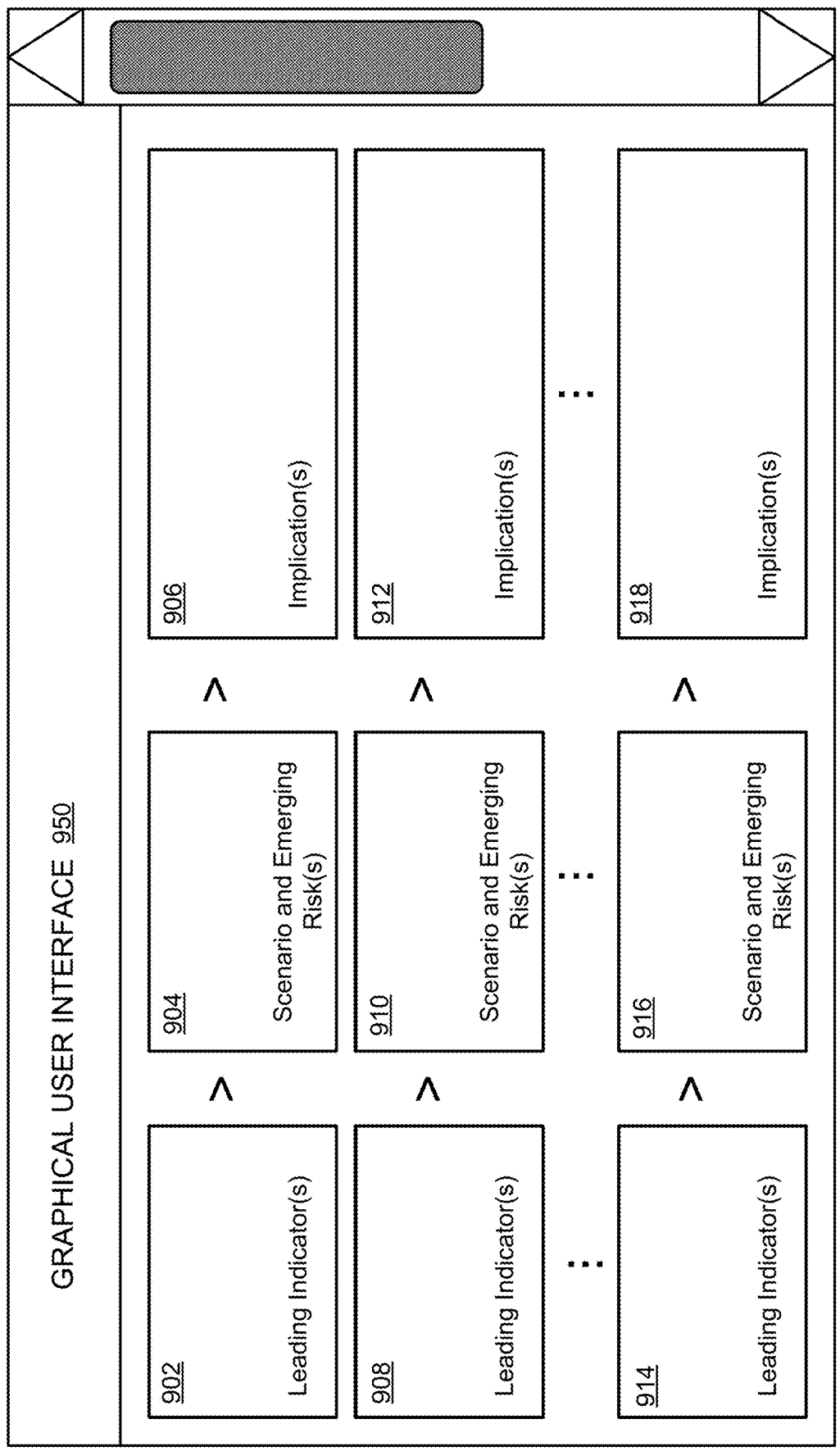
FIG. 9 illustrates a block diagram of an example, non-limiting graphical user interface in accordance with one or more embodiments of the disclosed subject matter.

FIG. 9 illustrates a block diagram of an example, non-limiting graphical user interface in accordance with one or more embodiments of the disclosed subject matter. As illustrated, the graphical user interface 950 can include portion 902, portion 904, portion 906, portion 908, portion 910, portion 912, portion 914, portion 916, and portion 918, presented for and editable by a user. The graphical user interface 950 can be generated by a processing device and presented via an output device such as, for example, a computer monitor or other presentation device. Repetitive description of like elements employed in other embodiments described herein is omitted for the sake of brevity.

Generally, the graphical user interface 950 is arranged as future projected scenario user interface to facilitate presentation of leading indicators, scenarios and emerging risks, implications, and other suitable information. For example, the portion 902, the portion 908, and the portion 914 can present one or more leading indicators extracted from the risk driver model. Furthermore, the portion 904, the portion 910, and the portion 916 present one or more possible future scenarios and/or emerging risks. Additionally, the portion 906, the portion 912, and the portion 918 present one or more possible implications. It is noted that the particular arrangement of the portions of graphical user interface 950 is non-limiting, and that the graphical user interface 950 can take multiple other forms.

As described above, an artificial intelligence driven solution to scenario planning has been provided through the various embodiments described herein. Embodiments described in this disclosure can include, for example, a computer-implemented method and a system 100 that can provide the described solution. The computer-implemented method can comprise analyzing, by a device operatively coupled to a processor, content using a topic model. The content can be associated with a defined source and is related to one or more current events. The computer-implemented method can also comprise determining, by the device, one or more portions of the analyzed content that are relevant to one or more key risk drivers using a risk driver model. The computer-implemented method can also comprise aggregating, by the electronic device, the determined one or more portions into one or more emerging storylines based on values of one or more attributes of the topic model.

The aggregated emerging storylines are advantageous in that the emerging storylines take into consideration current expert knowledge, current events, current news data, current social media data, current social media trends, and other current information. Through the processing of information received from these defined sources, a technical benefit exists in that less user interaction can be necessary for generating a similarly robust view of emerging risk or future scenarios. Thus, the aggregated emerging storylines are advantageous in that several current sources of information are considered in a relatively rapid manner.

Additionally, embodiments have been described that can implement scenario planning in support of risk management, where the emerging risks can be identified from one or more future scenarios that are generated by reasoning about the key risk drivers that drive the emerging risks, leading indicators of emerging risks, effects, and the business implications associated with the emerging risks. As described, scenario planning according to some embodiments can include carrying out this reasoning in the context of the emerging storylines derived from input received from the defined sources.

Accordingly, some embodiments can facilitate the identification of the possible future scenarios and therefore the possible emerging risks that may not be immediately identifiable without following rigorous analysis. The identification of the possible future scenarios can further help identify business insights related to these emerging risks. In addition, the identification of the possible future scenarios can allow for effective knowledge capture and sharing. Furthermore, the identification of the possible future scenarios can facilitate the consideration of complexities that go beyond average human skill. The consideration of the complexities in identifying possible future scenarios therefore saves time, reduces complexity, and increases accuracy through use of formal reasoning steps that can be implemented by a computer, and hence can improve the efficiency and the effectiveness of the risk management.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
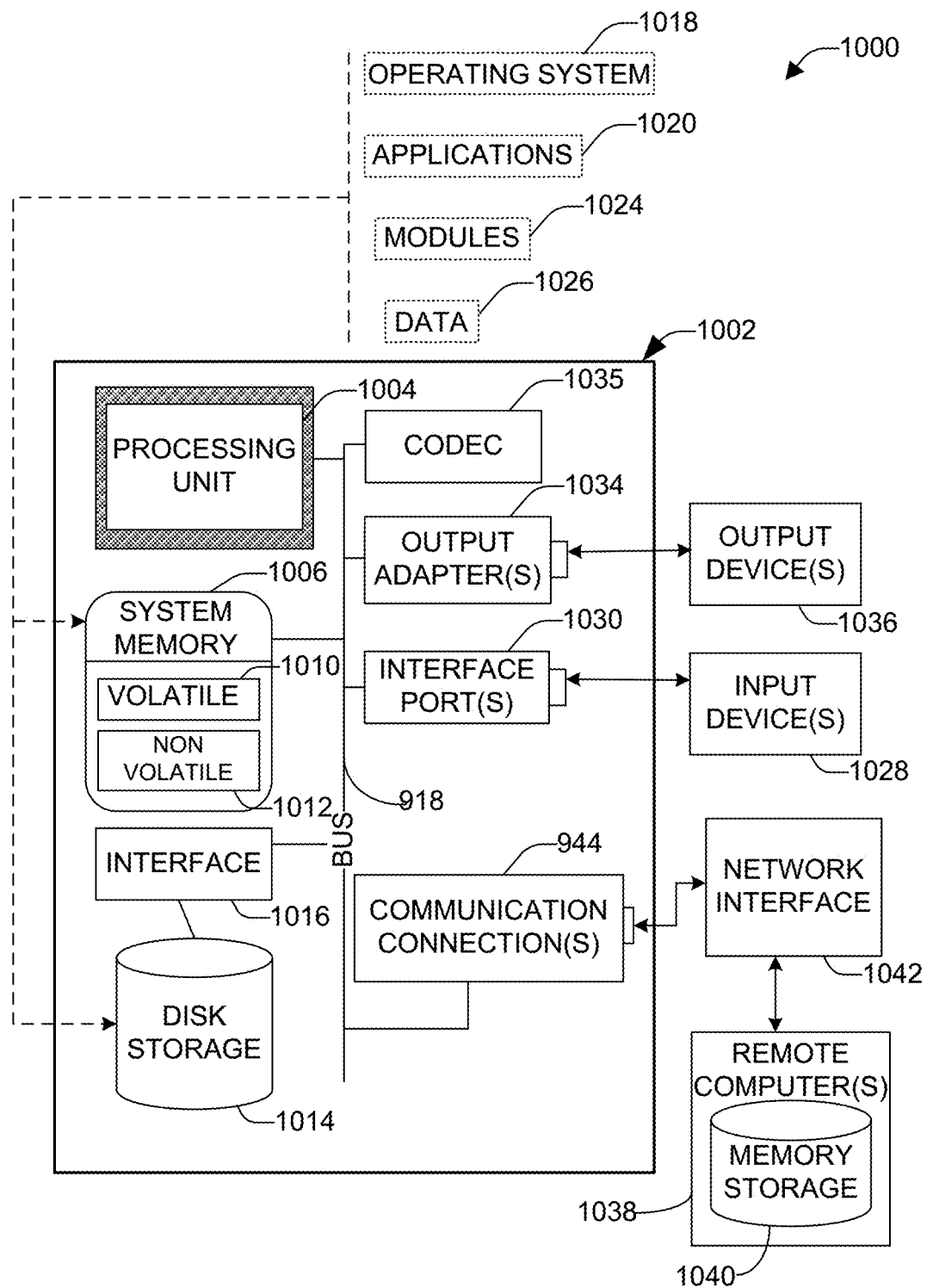
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for scenario planning, the computer program product comprising a tangible computer readable storage medium having program instructions embodied therewith, the program instructions executable by a processor to cause the processor to:
   receive real-time electronic data from a web-crawling system, wherein the real-time electronic data comprises one or more observations;
   based on the one or more observations, iteratively generate one or more projected future scenarios for solving a risk management problem, wherein the iterative generation comprises:
      analyzing real-time content using a topic model, wherein the real-time content is associated with at least one defined source and is related to one or more current events;
      determining that one or more portions of the analyzed real-time content that are relevant to one or more key risk drivers of a business entity using a risk driver model;
      aggregating and translating the determined one or more portions into one or more emerging storylines based on values of one or more attributes of the topic model;
      receiving expert domain information regarding at least one of the one or more key risk drivers,
      generating the one or more projected future scenarios for an organization using at least one of the one or more key risk drivers selected by artificial intelligence processes, based on the one or more emerging storylines, wherein the generation of the one or more projected future scenarios comprises:
         generating an artificial intelligence planning problem based on the at least one of one or more key risk drivers and the one or more emerging storylines, wherein the artificial intelligence planning problem is defined by a tuple comprising a finite set of fluent conditions, a set of actions with preconditions, an initial state of the finite set of fluent conditions, and a goal state of the finite set of fluent conditions,
         generating a plurality of plans based on the artificial intelligence planning problem, and
         generating the one or more projected future scenarios based upon clustering plans of the plurality of plans according to a defined clustering process; and
      processing the expert domain information associated with electronic real-time data to iteratively refine artificial intelligence processes, and the one or more projected future scenarios; and
   electronically output in real-time, to a computer monitor, electronic visual information via a graphical user interface that presents the generated one or more projected future scenarios in real time in conjunction with the one or more current events, wherein the one or more projected future scenarios comprise a future scenario with one or more leading indicators of the one or more key risk drivers that cause the future scenario, an emerging risk to the business entity resulting from the future scenario, and an implication to the business entity of the emerging risk, wherein computation time for the processor is improved such that the computation time to perform actions of the data aggregation component and the artificial intelligence component for the processor is reduced below a defined threshold.

2. The computer program product of claim 1, wherein the real-time electronic data is retrieved by the web-crawling system from sources comprising news sources, user postings on social media, and trending topics on social media.

3. The computer program product of claim 1, wherein the topic model comprises key people or organizations identified in the expert domain information that are able to influence at least one key risk driver identified in a risk driver model.

4. The computer program product of claim 3, wherein the risk driver model comprises one or more content monitoring topics corresponding to a leading indicator of a key risk driver, and wherein relevant key risk drivers for the real-time electronic data are determined based on topics that are associated with the one or more content monitoring topics by applying the topic model.

5. The computer program product of claim 1, wherein generating the artificial intelligence planning problem comprises:
   combining the one or more emerging storylines with one or more attributes extracted from the real-time electronic data.

6. The computer program product of claim 3, wherein the risk driver model comprises emerging risk information comprising a probable emerging risk, and a possible emerging risk.

7. A system, comprising:
   a memory that stores computer executable components; and
   a processor that executes the computer executable components stored in the memory, wherein the computer executable components comprise:
      a data aggregation component that performs one or more methodologies to compute one or more solutions to a risk management problem and output one or more projected future scenarios based on electronic data obtained from one or more web-crawling systems;
      an artificial intelligence component that:
         iteratively generates one or more projected future scenarios, wherein the iterative generation comprises:
            analysis of real-time content using a topic model, wherein the real-time content is associated with at least one defined source and is related to one or more current events;

determination of one or more portions of the analyzed real-time content that are relevant to one or more key risk drivers of a business entity using a risk driver model;

aggregation of and translation of the determined one or more portions into one or more emerging storylines based on values of one or more attributes of the topic model;

receipt of expert domain information regarding at least one of the one or more key risk drivers, generation of the one or more projected future scenarios for an organization using the at least one of the one or more key risk drivers selected by artificial intelligence processes based on the one or more emerging storylines, wherein the generation of the one or more projected future scenarios comprises:

generation of an artificial intelligence planning problem based on the at least one of one or more key risk drivers and the one or more emerging storylines, wherein the artificial intelligence planning problem is defined by a tuple comprising a finite set of fluent conditions, a set of actions with preconditions, an initial state of the finite set of fluent conditions, and a goal state of the finite set of fluent conditions, generation a plurality of plans based on the artificial intelligence planning problem, and generation of the one or more projected future scenarios based upon clustering plans of the plurality of plans according to a defined clustering process; and processing of the expert domain information associated with electronic real-time data to iteratively refine, artificial intelligence processes, the one or more projected future scenarios; and electronically outputs, to a display device, electronic visual information via a graphical user interface that presents the generated one or more projected future scenarios in real time in conjunction with the one or more current events, wherein the one or more projected future scenarios comprise a future scenario with one or more leading indicators of the one or more key risk drivers that cause the future scenario, an emerging risk to the business entity resulting from the future scenario, and an implication to the business entity of the emerging risk, wherein computation time for the processor is improved such that the computation time to perform actions of the data aggregation component and the artificial intelligence component for the processor is reduced below a defined threshold.

8. The system of claim 7, wherein the defined source is also selected from the group consisting of news sources, user postings on social media, and trending topics on social media.

9. The system of claim 7, wherein the topic model comprises key people or organizations that are able to influence at least one key risk driver identified in the risk driver model.

10. The system of claim 7, wherein the risk driver model comprises one or more content monitoring topics corresponding to a leading indicator of a key risk driver.

11. The system of claim 7, wherein the artificial intelligence component aggregates the determined one or more portions based on combining the one or more emerging storylines with one or more attributes extracted from the real-time content.

12. The system of claim 7, wherein the one or more projected future scenarios comprise a scenario from the group consisting of a probable emerging risk, a possible emerging risk, and an associated business implication.

* * * * *